(12) United States Patent
Xu et al.

(10) Patent No.: US 12,155,430 B2
(45) Date of Patent: Nov. 26, 2024

(54) COMMUNICATION METHOD AND APPARATUS

(71) Applicant: HUAWEI TECHNOLOGIES CO., LTD., Shenzhen (CN)

(72) Inventors: Jianbiao Xu, Shanghai (CN); Gaoning He, Boulogne Billancourt (FR); Jianmin Lu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/073,608

(22) Filed: Dec. 2, 2022

(65) Prior Publication Data

US 2023/0098191 A1   Mar. 30, 2023

Related U.S. Application Data

(63) Continuation of application No. PCT/CN2021/096181, filed on May 26, 2021.

(30) Foreign Application Priority Data

Jun. 3, 2020 (CN) .......................... 202010496328.2

(51) Int. Cl.
*H04B 7/02* (2018.01)
*H04B 7/0456* (2017.01)

(52) U.S. Cl.
CPC ................................. *H04B 7/0456* (2013.01)

(58) Field of Classification Search
CPC .. H04B 7/0456; H04B 7/0639; H04B 7/0478; H04B 7/0413
USPC ........................................................ 375/267
See application file for complete search history.

(56) References Cited

U.S. PATENT DOCUMENTS

| 9,306,646 B2 * | 4/2016 | Park | H04B 7/0639 |
| 10,263,673 B2 * | 4/2019 | Zhang | H04B 7/0456 |
| 2013/0058434 A1 * | 3/2013 | Chockalingam | H04B 7/0452 375/296 |

(Continued)

FOREIGN PATENT DOCUMENTS

| CN | 109150256 A | 1/2019 |
| CN | 108012583 B | 5/2020 |

OTHER PUBLICATIONS

3GPP TS 38.214 V16.1.0 (Mar. 2020), 3rd Generation Partnership Project; Technical Specification Group Radio Access Network;NR;Physical layer procedures for data(Release 16), 151 pages.

(Continued)

*Primary Examiner* — Helene E Tayong
(74) *Attorney, Agent, or Firm* — HAUPTMAN HAM, LLP

(57) ABSTRACT

This application provides a communication method and apparatus, and relates to the field of communication technologies. In the method, a first communication apparatus determines a first index indicating a first precoding vector, and sends the first index to a second communication apparatus. The second communication apparatus receives the first index from the first communication apparatus, determines the first precoding vector based on the first index, and precodes data based on the first precoding vector. The first precoding vector includes spatial angle information and spatial depth information of a channel between the first communication apparatus and the second communication apparatus.

20 Claims, 11 Drawing Sheets

(56) References Cited

U.S. PATENT DOCUMENTS

2018/0091198 A1    3/2018  Zhang et al.

OTHER PUBLICATIONS

Zhou, Zhou et al, Spherical Wave Channel and Analysis for Large Linear Array in LoS Conditions, 2015 IEEE Globecom Workshops (GC Wkshps), 7 pages.
Xiang Gao et al, Massive MIMO channels—measurements and models, Asilomar 2013, IEEE, 5 pages.
R1-1709232, Samsung et al, WF on Type I and II CSI codebooks, 3GPP TSG-RAN WG1 #89, Hangzhou, China, May 15-19, 2017, 24 pages.
Extended European Search Report issued in corresponding European Application No. 21817207.0, dated Sep. 29, 2023, pp. 1-6.
International Search Report issued in corresponding International Application No. PCT/CN2021/096181, dated Aug. 23, 2021, pp. 1-10.
India Office Action issued in corresponding India Application No. 202217070622, dated Sep. 16, 2024, pp. 1-6.

\* cited by examiner

COMMUNICATION METHOD AND APPARATUS

CROSS-REFERENCE TO RELATED APPLICATIONS

This application is a continuation of International Application No. PCT/CN2021/096181, filed on May 26, 2021, which claims priority to Chinese Patent Application No. 202010496328.2, filed on Jun. 3, 2020. The disclosures of the aforementioned applications are hereby incorporated by reference in their entireties.

TECHNICAL FIELD

This application relates to the field of communication technologies, and in particular, to a communication method and apparatus.

BACKGROUND

Massive multiple-input multiple-output (MIMO) is an important technical means for improving system capacity and spectral efficiency in a wireless communication system. A basic principle of massive multiple-input multiple-output is that a network device determines, based on channel state information (CSI), an effective transmission space of a channel by using a method such as singular value decomposition (SVD). A plurality of orthogonal or nearly orthogonal parallel subchannels exist in the transmission space, and a plurality of independent data streams are sent on these parallel subchannels to obtain a spatial multiplexing gain in which capacity increases exponentially. Therefore, a key condition for obtaining the spatial multiplexing gain in this technology is that the network device can obtain sufficiently accurate CSI.

Refer to FIG. 1. Currently, a process in which a network device obtains CSI may include: The network device sends a pilot signal to a terminal; the terminal obtains a CSI estimation value based on the received pilot signal, selects a precoding vector from a codebook based on the CSI estimation value, and feeds back an index of the precoding vector to the network device; and the network device determines a CSI reconstruction value based on the index of the precoding vector, where the CSI reconstruction value is CSI that can be obtained by the network device and that is closest to a CSI truth value.

An existing codebook technology is generally based on a plane wave propagation model, and mainly reflects spatial angle information of a channel. When the channel no longer fits the plane wave propagation model, the CSI reconstruction value deviates greatly from the CSI truth value. This reduces a spatial multiplexing gain and array gain of massive MIMO.

SUMMARY

Embodiments of this application provide a communication method and apparatus, to improve a spatial multiplexing gain, an array gain, and the like of massive MIMO.

To achieve the foregoing objective, embodiments of this application provide the following technical solutions.

According to a first aspect, a communication method is provided, including: A first communication apparatus determines a first index indicating a first precoding vector, and sends the first index to a second communication apparatus. The first precoding vector includes spatial angle information and spatial depth information of a channel between the first communication apparatus and the second communication apparatus. Spatial depth information is introduced into a precoding vector, so that a channel can be determined from dimensions of spatial angle and spatial depth, and a precoding vector corresponding to an index fed back by the first communication apparatus can match a spherical wave channel characteristic. In other words, a CSI reconstruction value obtained by the second communication apparatus based on the precoding vector corresponding to the index fed back by the first communication apparatus is closer to a CSI truth value. In this way, a spatial multiplexing gain and an array gain of an ELAA are maximized.

In a possible implementation, a codebook to which the first precoding vector belongs includes K×M precoding vectors, each precoding vector is an N-dimensional vector, K is a quantization level quantity of a spatial depth of the channel corresponding to the codebook, M is a quantization level quantity of a spatial angle of the channel corresponding to the codebook, N is an antenna port quantity of the second communication apparatus, and K, M, and N are all integers greater than 0. This possible implementation provides a possible form of a codebook including spatial depth information and spatial angle information.

In a possible implementation, the codebook to which the first precoding vector belongs is obtained by sampling an antenna port group steering vector of the second communication apparatus by using a quantization level set of the spatial depth of the channel and a quantization level set of the spatial angle of the channel. This possible implementation provides a method for determining a codebook including spatial depth information and spatial angle information.

In a possible implementation, the antenna port group steering vector is determined based on the spatial depth of the channel, the spatial angle of the channel, and an antenna port group-related parameter of the second communication apparatus. The antenna port group-related parameter includes one or more of antenna port spacing, an antenna port quantity, and a spatial arrangement of antenna ports. This possible implementation provides a method for determining an antenna port group steering vector.

In a possible implementation, the quantization level set of the spatial depth of the channel is determined based on prior statistical information of the channel and an allowed quantity of bits for quantization. The prior statistical information includes: a maximum value of the spatial depth of the channel and a minimum value of the spatial depth of the channel, or an average value of spatial depths of the channel and a variance of spatial depths of the channel, or a probability distribution function of the spatial depth of the channel. This possible implementation provides a method for determining a quantization level set of a spatial depth of a channel.

In a possible implementation, that the first communication apparatus determines the first index includes: The first communication apparatus matches the codebook with an obtained CSI estimation value, to determine an index corresponding to a precoding vector that meets a matching degree requirement as the first index. This possible implementation provides a method for determining a first index.

In a possible implementation, that the first communication apparatus determines the first index includes: The first communication apparatus matches the codebook with an obtained CSI estimation value and a noise statistics covariance matrix, to determine an index corresponding to a precoding vector that meets a matching degree requirement as the first index. When the first communication apparatus performs multi-antenna reception, the first communication apparatus is usually interfered with by another user (for example, inter-cell interference of a neighboring station). In this case, the noise is usually spatial colored noise, and the colored noise causes an offset of a spatial angle and a spatial depth of a channel. By using a noise statistics covariance matrix, an index of an obtained codebook can reflect an equivalent spatial angle and spatial depth that are offset after being affected by the colored noise, so that a corresponding precoding vector can match a channel characteristic to a maximum extent, to obtain a maximum precoding gain and rate.

In a possible implementation, the first index includes L sub-indexes, where L represents a quantity of spatial multiplexing layers of the first communication apparatus, and L is an integer greater than 1, and that the first communication apparatus determines the first index includes: The first communication apparatus matches the codebook with an obtained CSI estimation value, to determine indexes corresponding to L precoding vectors that meet a matching degree requirement as the first index. This possible implementation provides another method for determining a first index.

In a possible implementation, the first index includes L sub-indexes, where L represents a quantity of spatial multiplexing layers of the first communication apparatus, and L is an integer greater than 1, and that the first communication apparatus determines the first index includes: The first communication apparatus matches the codebook with an obtained CSI estimation value and a noise statistics covariance matrix, to determine indexes corresponding to L precoding vectors that meet a matching degree requirement as the first index. When the first communication apparatus performs multi-antenna reception, the first communication apparatus is usually interfered with by another user (for example, inter-cell interference of a neighboring station). In this case, the noise is usually spatial colored noise, and the colored noise causes an offset of a spatial angle and a spatial depth of a channel. By using a noise statistics covariance matrix, an index of an obtained codebook can reflect an equivalent spatial angle and spatial depth that are offset after being affected by the colored noise, so that a corresponding precoding vector can match a channel characteristic to a maximum extent, to obtain a maximum precoding gain and rate.

According to a second aspect, a communication method is provided, including: A second communication apparatus receives, from a first communication apparatus, a first index indicating a first precoding vector, determines the first precoding vector based on the first index, and precodes data based on the first precoding vector. The first precoding vector includes spatial angle information and spatial depth information of a channel between the first communication apparatus and the second communication apparatus. Spatial depth information is introduced into a precoding vector, so that a channel can be determined from dimensions of spatial angle and spatial depth, and a precoding vector corresponding to an index fed back by the first communication apparatus can match a spherical wave channel characteristic. In other words, a CSI reconstruction value obtained by the second communication apparatus based on the precoding vector corresponding to the index fed back by the first communication apparatus is closer to a CSI truth value. In this way, a spatial multiplexing gain and an array gain of an ELAA are maximized.

In a possible implementation, the method further includes: The second communication apparatus separately receives indexes from S-1 first communication apparatuses other than the first communication apparatus, where S is an integer greater than 1. When precoding vectors corresponding to S1 indexes of S indexes have a same spatial angle component but different spatial depth components, the second communication apparatus performs multiplex transmission with S1 first communication apparatuses based on the spatial depth components of the precoding vectors corresponding to the S1 indexes, where the S1 indexes are a part or all of the S indexes, the S indexes are indexes received by the second communication apparatus from the first communication apparatus and the S-1 first communication apparatuses, the S1 first communication apparatuses are first communication apparatuses that report the S1 indexes, and S1 is an integer greater than 1 and less than or equal to S. When precoding vectors corresponding to S2 indexes of S indexes have different spatial angle components and different spatial depth components, the second communication apparatus performs multiplex transmission with S2 first communication apparatuses based on the spatial depth components and/or the spatial angle components of the precoding vectors corresponding to the S2 indexes, where the S2 indexes are a part or all of the S indexes, the S indexes are indexes received by the second communication apparatus from the first communication apparatus and the S-1 first communication apparatuses, the S2 first communication apparatuses are first communication apparatuses that report the S2 indexes, and S2 is an integer greater than 1 and less than or equal to S. In this possible implementation, when precoding vectors corresponding to indexes sent by different first communication apparatuses have different spatial depth components, the second communication apparatus may distinguish, based on the indexes, a spatial depth difference between channels of different first communication apparatuses, and perform multiplex transmission of data based on the spatial depth difference. In other words, the second communication apparatus may allocate data streams of different layers based on different spatial depth components. This improves a total quantity of spatial multiplexing layers and system capacity of SU-MIMO or MU-MIMO. For example, in a heavy-load service scenario in which users are densely distributed, Q (Q is an integer greater than 1) users that cannot be identified and multiplexed based on a spatial angle may be identified and multiplexed based on a spatial depth. This improves capacity by Q times.

In a possible implementation, the method further includes: The second communication apparatus separately receives indexes from S-1 first communication apparatuses other than the first communication apparatus, where S is an integer greater than 1. When precoding vectors corresponding to S3 indexes of S indexes have different spatial depth components, the second communication apparatus performs multiplex transmission with S3 first communication apparatuses based on the spatial depth components of the precoding vectors corresponding to the S3 indexes, where the S3 indexes are a part or all of the S indexes, the S indexes are indexes received by the second communication apparatus from the first communication apparatus and the S-1 first communication apparatuses, the S3 first communication apparatuses are first communication apparatuses that report the S3 indexes, and S3 is an integer greater than 1 and less than or equal to S. In this possible implementation, when precoding vectors corresponding to indexes sent by different first communication apparatuses have different spatial depth components, the second communication apparatus may distinguish, based on the indexes, a spatial depth difference between channels of different first communication apparatuses, and perform multiplex transmission of data based on the spatial depth difference. In other words, the second communication apparatus may allocate data streams of different layers based on different spatial depth components. This improves a total quantity of spatial multiplexing layers and system capacity of SU-MIMO or MU-MIMO. For example, in a heavy-load service scenario in which users are densely distributed, Q (Q is an integer greater than 1) users that cannot be identified and multiplexed based on a spatial angle may be identified and multiplexed based on a spatial depth. This improves capacity by Q times.

In a possible implementation, a codebook to which the first precoding vector belongs includes K×M precoding vectors, each precoding vector is an N-dimensional vector, K is a quantization level quantity of a spatial depth of the channel corresponding to the codebook, M is a quantization level quantity of a spatial angle of the channel corresponding to the codebook, N is an antenna port quantity of the second communication apparatus, and K, M, and N are all integers greater than 0. This possible implementation, provides a possible form of a codebook including spatial depth information and spatial angle information.

In a possible implementation, the codebook to which the first precoding vector belongs is obtained by sampling an antenna port group steering vector of the second communication apparatus by using a quantization level set of the spatial depth of the channel and a quantization level set of the spatial angle of the channel. This possible implementation provides a method for determining a codebook including spatial depth information and spatial angle information.

In a possible implementation, the antenna port group steering vector is determined based on the spatial depth of the channel, the spatial angle of the channel, and an antenna port group-related parameter of the second communication apparatus. The antenna port group-related parameter includes one or more of antenna port spacing, an antenna port quantity, and a spatial arrangement of antenna ports. This possible implementation provides a method for determining an antenna port group steering vector.

In a possible implementation, the quantization level set of the spatial depth of the channel is determined based on prior statistical information of the channel and an allowed quantity of bits for quantization. The prior statistical information includes: a maximum value of the spatial depth of the channel and a minimum value of the spatial depth of the channel, or an average value of spatial depths of the channel and a variance of spatial depths of the channel, or a probability distribution function of the spatial depth of the channel. This possible implementation provides a method for determining a quantization level set of a spatial depth of a channel.

In a possible implementation, an index corresponding to a precoding vector that meets a matching degree requirement in the codebook is the first index, and the precoding vector that meets the matching degree requirement is determined by matching the codebook with a CSI estimation value determined by the first communication apparatus, or the precoding vector that meets the matching degree requirement is determined by matching the codebook with a CSI estimation value and a noise statistics covariance matrix that are determined by the first communication apparatus. This possible implementation provides two methods for determining a first index. When the first communication apparatus performs multi-antenna reception, the first communication apparatus is usually interfered with by another user (for example, inter-cell interference of a neighboring station). In this case, the noise is usually spatial colored noise, and the colored noise causes an offset of a spatial angle and a spatial depth of a channel. By using a noise statistics covariance matrix, an index of an obtained codebook can reflect an equivalent spatial angle and spatial depth that are offset after being affected by the colored noise, so that a corresponding precoding vector can match a channel characteristic to a maximum extent, to obtain a maximum precoding gain and rate.

In a possible implementation, the first index includes L sub-indexes, indexes corresponding to L precoding vectors that meet a matching degree requirement in the codebook are the first index, and the L precoding vectors that meet the matching degree requirement are determined by matching the codebook with a CSI estimation value determined by the first communication apparatus; or the L precoding vectors that meet the matching degree requirement are determined by matching the codebook with a CSI estimation value and a noise statistics covariance matrix that are determined by the first communication apparatus. This possible implementation provides two methods for determining a first index. When the first communication apparatus performs multi-antenna reception, the first communication apparatus is usually interfered with by another user (for example, inter-cell interference of a neighboring station). In this case, the noise is usually spatial colored noise, and the colored noise causes an offset of a spatial angle and a spatial depth of a channel. By using a noise statistics covariance matrix, an index of an obtained codebook can reflect an equivalent spatial angle and spatial depth that are offset after being affected by the colored noise, so that a corresponding precoding vector can match a channel characteristic to a maximum extent, to obtain a maximum precoding gain and rate.

According to a third aspect, a communication apparatus is provided, including a module or a unit configured to perform any method provided in the first aspect. For example, a processing unit and a communication unit are included. The processing unit is configured to determine a first index, the first index indicates a first precoding vector, and the first precoding vector includes spatial angle information and spatial depth information of a channel between the communication apparatus and a second communication apparatus. The communication unit is configured to send the first index to the second communication apparatus.

In a possible implementation, a codebook to which the first precoding vector belongs includes K×M precoding vectors, each precoding vector is an N-dimensional vector, K is a quantization level quantity of a spatial depth of the channel corresponding to the codebook, M is a quantization level quantity of a spatial angle of the channel corresponding to the codebook, N is an antenna port quantity of the second communication apparatus, and K, M, and N are all integers greater than 0.

In a possible implementation, the codebook to which the first precoding vector belongs is obtained by sampling an antenna port group steering vector of the second communication apparatus by using a quantization level set of the spatial depth of the channel and a quantization level set of the spatial angle of the channel.

In a possible implementation, the antenna port group steering vector is determined based on the spatial depth of the channel, the spatial angle of the channel, and an antenna port group-related parameter of the second communication apparatus. The antenna port group-related parameter includes one or more of antenna port spacing, an antenna port quantity, and a spatial arrangement of antenna ports.

In a possible implementation, the quantization level set of the spatial depth of the channel is determined based on prior statistical information of the channel and an allowed quantity of bits for quantization. The prior statistical information includes: a maximum value of the spatial depth of the channel and a minimum value of the spatial depth of the channel, or an average value of spatial depths of the channel and a variance of spatial depths of the channel, or a probability distribution function of the spatial depth of the channel.

In a possible implementation, the processing unit is specifically configured to: match the codebook with an obtained CSI estimation value, to determine an index corresponding to a precoding vector that meets a matching degree requirement as the first index.

In a possible implementation, the processing unit is specifically configured to: match the codebook with an obtained CSI estimation value and a noise statistics covariance matrix, to determine an index corresponding to a precoding vector that meets a matching degree requirement as the first index.

In a possible implementation, the first index includes L sub-indexes, where L represents a quantity of spatial multiplexing layers of the communication apparatus, and L is an integer greater than 1, and the processing unit is specifically configured to: match the codebook with an obtained CSI estimation value, to determine indexes corresponding to L precoding vectors that meet a matching degree requirement as the first index.

In a possible implementation, the first index includes L sub-indexes, where L represents a quantity of spatial multiplexing layers of the communication apparatus, and L is an integer greater than 1, and the processing unit is specifically configured to: match the codebook with an obtained CSI estimation value and a noise statistics covariance matrix, to determine indexes corresponding to L precoding vectors that meet a matching degree requirement as the first index.

According to a fourth aspect, a communication apparatus is provided, including a module or a unit configured to perform any method provided in the second aspect. For example, a communication unit and a processing unit are included. The communication unit is configured to receive a first index from a first communication apparatus, the first index indicates a first precoding vector, and the first precoding vector includes spatial angle information and spatial depth information of a channel between the first communication apparatus and the communication apparatus. The processing unit is configured to determine the first precoding vector based on the first index, and precode data based on the first precoding vector.

In a possible implementation, the communication unit is further configured to separately receive indexes from S-1 first communication apparatuses other than the first communication apparatus, where S is an integer greater than 1. The processing unit is further configured to: when precoding vectors corresponding to S1 indexes of S indexes have a same spatial angle component but different spatial depth components, perform multiplex transmission with S1 first communication apparatuses based on the spatial depth components of the precoding vectors corresponding to the S1 indexes, where the S1 indexes are a part or all of the S indexes, the S indexes are indexes received by the communication apparatus from the first communication apparatus and the S-1 first communication apparatuses, the S1 first communication apparatuses are first communication apparatuses that report the S1 indexes, and S1 is an integer greater than 1 and less than or equal to S. The processing unit is further configured to: when precoding vectors corresponding to S2 indexes of S indexes have different spatial angle components and different spatial depth components, perform multiplex transmission with S2 first communication apparatuses based on the spatial depth components and/or the spatial angle components of the precoding vectors corresponding to the S2 indexes, where the S2 indexes are a part or all of the S indexes, the S indexes are indexes received by the communication apparatus from the first communication apparatus and the S-1 first communication apparatuses, the S2 first communication apparatuses are first communication apparatuses that report the S2 indexes, and S2 is an integer greater than 1 and less than or equal to S.

In a possible implementation, the communication unit is further configured to separately receive indexes from S-1 first communication apparatuses other than the first communication apparatus, where S is an integer greater than 1. The processing unit is further configured to: when precoding vectors corresponding to S3 indexes of S indexes have different spatial depth components, perform multiplex transmission with S3 first communication apparatuses based on the spatial depth components of the precoding vectors corresponding to the S3 indexes, where the S3 indexes are a part or all of the S indexes, the S indexes are indexes received by the communication apparatus from the first communication apparatus and the S-1 first communication apparatuses, the S3 first communication apparatuses are first communication apparatuses that report the S3 indexes, and S3 is an integer greater than 1 and less than or equal to S.

In a possible implementation, a codebook to which the first precoding vector belongs includes K×M precoding vectors, each precoding vector is an N-dimensional vector, K is a quantization level quantity of a spatial depth of the channel corresponding to the codebook, M is a quantization level quantity of a spatial angle of the channel corresponding to the codebook, N is an antenna port quantity of the communication apparatus, and K, M, and N are all integers greater than 0.

In a possible implementation, the codebook to which the first precoding vector belongs is obtained by sampling an antenna port group steering vector of the communication apparatus by using a quantization level set of the spatial depth of the channel and a quantization level set of the spatial angle of the channel.

In a possible implementation, the antenna port group steering vector is determined based on the spatial depth of the channel, the spatial angle of the channel, and an antenna port group-related parameter of the communication apparatus. The antenna port group-related parameter includes one or more of antenna port spacing, an antenna port quantity, and a spatial arrangement of antenna ports.

In a possible implementation, the quantization level set of the spatial depth of the channel is determined based on prior statistical information of the channel and an allowed quantity of bits for quantization. The prior statistical information includes: a maximum value of the spatial depth of the channel and a minimum value of the spatial depth of the channel, or an average value of spatial depths of the channel and a variance of spatial depths of the channel, or a probability distribution function of the spatial depth of the channel.

In a possible implementation, an index corresponding to a precoding vector that meets a matching degree requirement in the codebook is the first index, and the precoding vector that meets the matching degree requirement is determined by matching the codebook with a CSI estimation value determined by the first communication apparatus, or the precoding vector that meets the matching degree requirement is determined by matching the codebook with a CSI estimation value and a noise statistics covariance matrix that are determined by the first communication apparatus.

In a possible implementation, the first index includes L sub-indexes, indexes corresponding to L precoding vectors that meet a matching degree requirement in the codebook are the first index, and the L precoding vectors that meet the matching degree requirement are determined by matching the codebook with a CSI estimation value determined by the first communication apparatus; or the L precoding vectors that meet the matching degree requirement are determined by matching the codebook with a CSI estimation value and a noise statistics covariance matrix that are determined by the first communication apparatus.

According to a fifth aspect, a communication apparatus is provided and includes a processor. The processor is connected to a memory, the memory is configured to store computer-executable instructions, and the processor executes the computer-executable instructions stored in the memory, to implement any method provided in the first aspect. For example, the memory and the processor may be integrated together, or may be independent components. If the memory and the processor are independent components, the memory may be located inside the communication apparatus, or may be located outside the communication apparatus.

In a possible implementation, the processor includes a logic circuit and at least one of an input interface and an output interface. For example, the output interface is configured to perform a sending action in a corresponding method, and the input interface is configured to perform a receiving action in the corresponding method.

In a possible implementation, the communication apparatus further includes a communication interface and a communication bus. The processor, the memory, and the communication interface are connected through the communication bus. The communication interface is configured to perform receiving and sending actions in the corresponding method. The communication interface may also be referred to as a transceiver. Optionally, the communication interface includes at least one of a transmitter and a receiver. In this case, the transmitter is configured to perform a sending action in a corresponding method, and the receiver is configured to perform a receiving action in the corresponding method.

In a possible implementation, the communication apparatus exists in a product form of a chip.

According to a sixth aspect, a communication apparatus is provided and includes a processor. The processor is connected to a memory, the memory is configured to store computer-executable instructions, and the processor executes the computer-executable instructions stored in the memory, to implement any method provided in the second aspect. For example, the memory and the processor may be integrated together, or may be independent components. If the memory and the processor are independent components, the memory may be located inside the communication apparatus, or may be located outside the communication apparatus.

In a possible implementation, the processor includes a logic circuit and at least one of an input interface and an output interface. For example, the output interface is configured to perform a sending action in a corresponding method, and the input interface is configured to perform a receiving action in the corresponding method.

In a possible implementation, the communication apparatus further includes a communication interface and a communication bus. The processor, the memory, and the communication interface are connected through the communication bus. The communication interface is configured to perform receiving and sending actions in the corresponding method. The communication interface may also be referred to as a transceiver. Optionally, the communication interface includes at least one of a transmitter and a receiver. In this case, the transmitter is configured to perform a sending action in a corresponding method, and the receiver is configured to perform a receiving action in the corresponding method.

In a possible implementation, the communication apparatus exists in a product form of a chip.

According to a seventh aspect, a communication apparatus is provided and includes a processor and an interface circuit. The interface circuit is configured to receive a signal from another communication apparatus other than the communication apparatus and transmit the signal to the processor, or send a signal from the processor to another communication apparatus other than the communication apparatus. The processor is configured to implement any method provided in the first aspect by using a logic circuit or executing code instructions.

According to an eighth aspect, a communication apparatus is provided and includes a processor and an interface circuit. The interface circuit is configured to receive a signal from another communication apparatus other than the communication apparatus and transmit the signal to the processor, or send a signal from the processor to another communication apparatus other than the communication apparatus. The processor is configured to implement any method provided in the second aspect by using a logic circuit or executing code instructions.

According to a ninth aspect, a communication system is provided and includes the communication apparatus according to any one of the third aspect, the fifth aspect, and the seventh aspect, and the communication apparatus according to any one of the fourth aspect, the sixth aspect, and the eighth aspect.

According to a tenth aspect, a computer-readable storage medium is provided and includes computer-executable instructions. When the computer-executable instructions are executed on a computer, the computer is enabled to perform any method provided in the first aspect or the second aspect.

According to an eleventh aspect, a computer program product is provided and includes computer-executable instructions. When the computer-executable instructions are executed on a computer, the computer is enabled to perform any method provided in the first aspect or the second aspect.

For technical effects brought by any implementation of the third aspect to the eleventh aspect, refer to technical effects brought by a corresponding implementation of the first aspect and the second aspect. Details are not described herein again.

It should be noted that the solutions in the foregoing aspects may be combined on the premise that the solutions are not contradictory.

DESCRIPTION OF EMBODIMENTS

The following describes the technical solutions in embodiments of this application with reference to the accompanying drawings in embodiments of this application. In descriptions of this application, unless otherwise specified, "/" means "or". For example, A/B may represent A or B. The term "and/or" in this specification describes only an association relationship for describing associated objects and represents that three relationships may exist. For example, A and/or B may represent the following three cases: Only A exists, both A and B exist, and only B exists. In addition, in the descriptions of this application, "a plurality of" means two or more than two unless otherwise specified.

This application may be applied to wireless communication systems such as a narrowband internet of things (NB-IoT) system, a global system for mobile communications (GSM), an enhanced data rates for GSM evolution (EDGE) system, a wideband code division multiple access (WCDMA) system, a code division multiple access 2000 (CDMA2000) system, a time division-synchronous code division multiple access (TD-SCDMA) system, a fourth generation (4G) system, various systems evolving based on a 4G system, a fifth generation (5G) system, various systems evolving based on a 5G system, and a satellite communication system. The 4G system may also be referred to as an evolved packet system (EPS). A core network of a 4G system may be referred to as an evolved packet core (EPC) network, and an access network may be referred to as long term evolution (LTE). A core network of a 5G system may be referred to as a 5GC (5G core), and an access network may be referred to as new radio (NR). Application scenarios to which this application is applicable include but are not limited to enhanced mobile broadband (eMBB), ultra-reliable low-latency communication (URLLC), massive machine type communication (mMTC), and the like.

Figure 1:
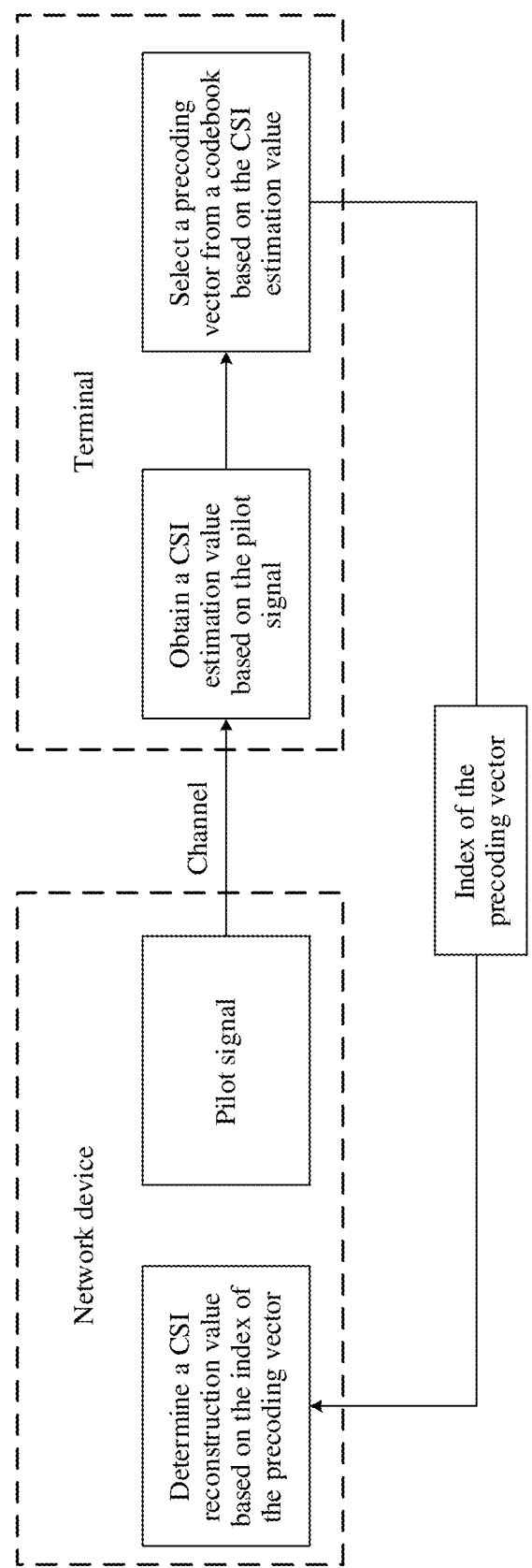
FIG. 1 is a flowchart of a method for obtaining a CSI reconstruction value.
Figure 2:
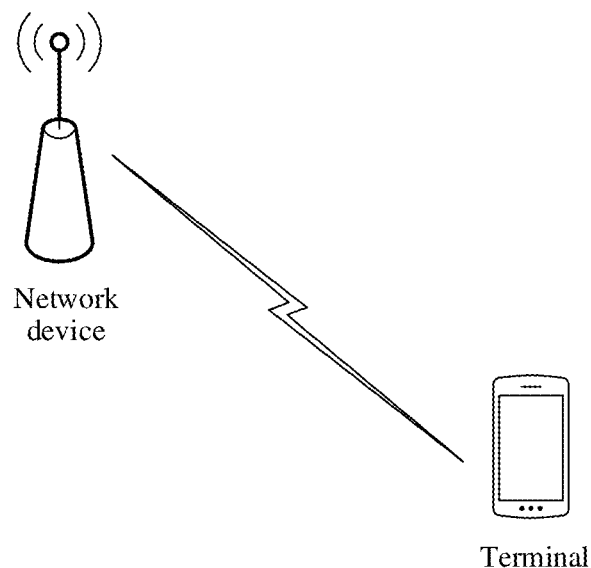
FIG. 2 is a schematic diagram of a network architecture according to an embodiment of this application.

Refer to FIG. 2. This application relates to a network device and a terminal. The network device and the terminal may perform wireless communication.

The network device in embodiments of this application may be a device configured on an access network side to support a terminal in accessing a communication system, for example, a macro base station or a micro base station (also referred to as a small cell) in various forms. Specifically, the network device may be a node B (node B) in a third generation (3G) system, an evolved base station (eNB) in a 4G system, a next generation base station (gNB) in a 5G system, a transmission reception point (TRP), a relay node (relay node), an access point (AP), or the like. The base station may include a baseband unit (BBU) and a remote radio unit (RRU). The BBU and the RRU may be placed at different places. For example, the RRU is remote and placed in a heavy-traffic area, and the BBU is placed in a central equipment room. Alternatively, the BBU and the RRU may be placed in a same equipment room. Alternatively, the BBU and the RRU may be different components at a same rack. The network device may be referred to as a base station, a base station device, a node, an access network device, or the like.

The terminal in embodiments of this application may be a device that provides a user with voice or data connectivity, and the terminal may also be referred to as user equipment (UE), a mobile station, a subscriber unit, a station, terminal equipment (TE), or the like. For example, the terminal may be a cellular phone, a personal digital assistant (PDA), a wireless modem, a handheld device, a laptop computer (laptop computer), a cordless phone (cordless phone), a wireless local loop (WLL) station, a tablet computer (pad), a smart phone (smartphone), customer premises equipment (CPE), an in-vehicle device, a wearable device, a wireless data card, a tablet computer, or a machine type communication (MTC) terminal, a computing device or other processing device connected to a wireless modem. With development of wireless communication technologies, a device that can access a communication system, a device that can communicate with a network side in the communication system, or a device that can communicate with another object by using the communication system may be the terminal in embodiments of this application, for example, a terminal and a vehicle in intelligent transportation, a household device in smart home, an electricity meter reading instrument in smart grid, a voltage monitoring instrument, an environment monitoring instrument, a video surveillance instrument in an intelligent security network, or a cashing machine.

To make embodiments of this application clearer, the following briefly describes some concepts in this application.

1. Antenna Array

Directivity of a single antenna is limited. For application in various scenarios, two or more single antennas that work at a same frequency are energized and arranged spatially according to a specific requirement, to form an antenna array, which is also referred to as an antenna array. An antenna radiation element forming the antenna array is referred to as an antenna array element or an antenna element. The antenna array can strengthen and improve directivity and intensity of a radiation field.

Figure 3:
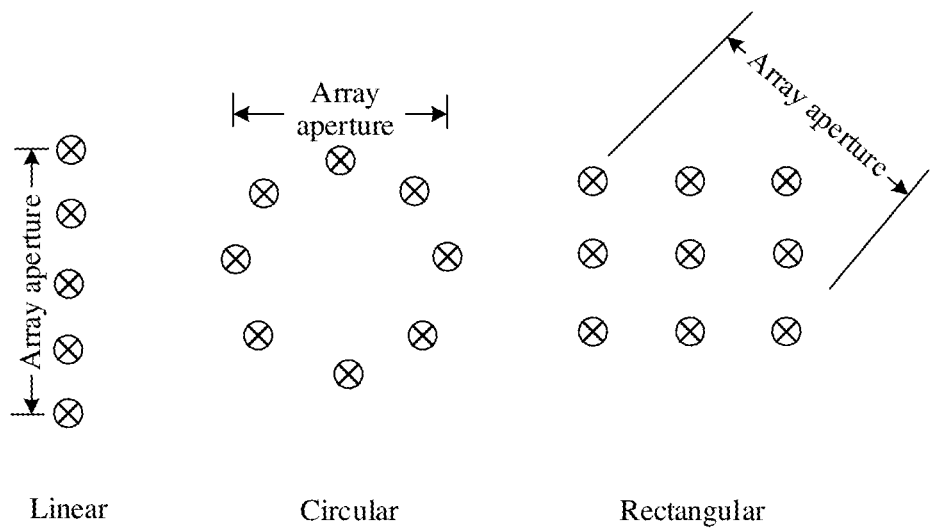
FIG. 3 is a schematic diagram of an antenna array according to an embodiment of this application.

The spatial arrangement of the antenna array may be referred to as a panel. Refer to FIG. 3. The spatial arrangement of the antenna array may be linear (in this case, the antenna array may be referred to as a linear array), circular, and rectangular. The spatial arrangement of the antenna array may also be others, which are not enumerated.

A distance between two antenna elements that are farthest from each other in a spatial arrangement of an antenna array may be referred to as an antenna array aperture. A distance between two adjacent antenna elements in the spatial arrangement of the antenna array may be referred to as spacing between the two antenna elements.

The antenna array may also be referred to as an antenna port group. The antenna port group includes one or more antenna ports, and one antenna port corresponds to one antenna element. In other words, an antenna array and an antenna port group in the following may be interchangeably used, and an antenna element and an antenna port may be interchangeably used.

2. Plane Wave and Spherical Wave

A plane wave is an electromagnetic wave whose electromagnetic wave front is a plane, and a spherical wave is an electromagnetic wave whose electromagnetic wave front is a spherical surface. The electromagnetic wave front refers to a curved surface formed by points with an equal electromagnetic wave phase.

It may be understood that, in a uniform medium, an electromagnetic wave propagates outward in a spherical diffusion manner, and therefore may be referred to as a spherical wave. However, when the wave propagates for a long distance, local curvature of the sphere is small and the wave can be considered as a plane wave.

Currently, whether an electromagnetic wave is a plane wave or a spherical wave may be usually determined by using a Rayleigh distance. An electromagnetic wave whose space propagation distance is greater than the Rayleigh distance may be considered as a plane wave, and an electromagnetic wave whose space propagation distance is less than the Rayleigh distance may be considered as a spherical wave.

Figure 4:
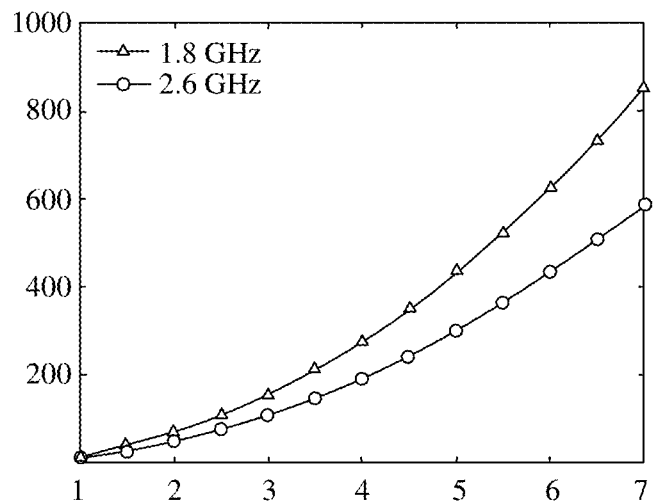
FIG. 4 is a schematic diagram in which a Rayleigh distance changes with an antenna array aperture according to an embodiment of this application.

A specific calculation formula of the Rayleigh distance may be expressed as: $R=2L^2\lambda^{-1}$. L represents an antenna array aperture, X represents a carrier wavelength, and R represents a Rayleigh distance. The preceding formula indicates that the Rayleigh distance increases with the square of the antenna array aperture. For example, FIG. 4 shows a possible case with quantitative results of the Rayleigh distance when the antenna array aperture increases on a carrier frequency of 1.8 gigahertz (GHz) and 2.6 GHz. In FIG. 4, a horizontal axis is the antenna array aperture, and a vertical axis is the Rayleigh distance. As shown in the figure, on the carrier frequency of 2.6 GHz, when the antenna array aperture is 7 meters (m), the Rayleigh distance is close to 850 m. That is, within a space propagation distance of 850 m, the channel no longer meets a plane wave assumption.

Figure 5:
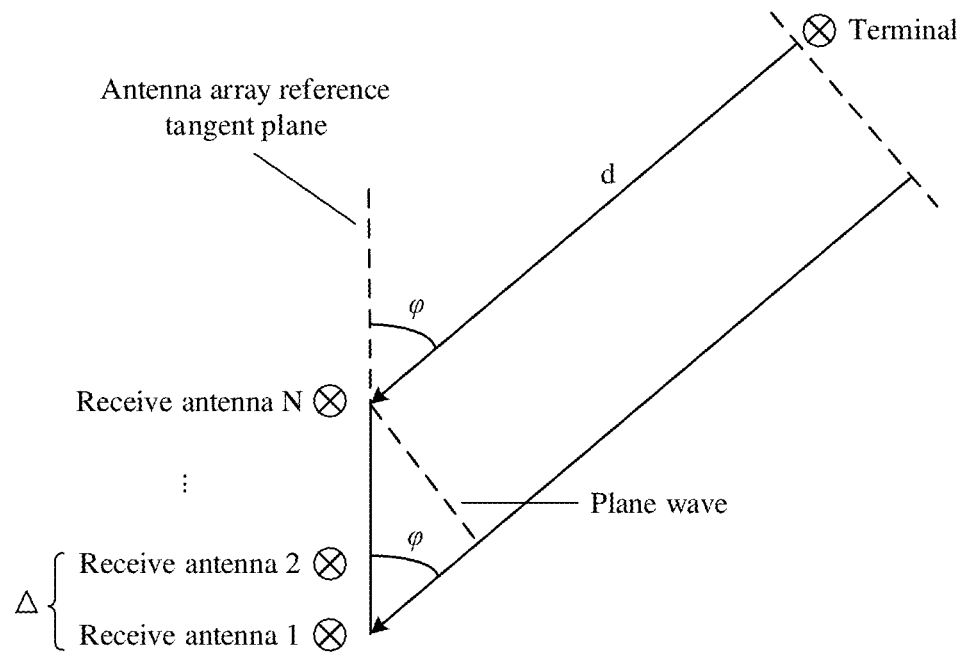
FIG. 5 is a schematic diagram of a plane wave according to an embodiment of this application.

In a wireless communication system, if a terminal is far enough away from a network device (for example, farther than 850 m), refer to FIG. 5. A channel between the terminal and the network device meets a plane wave assumption. If the terminal is not far enough away from the network device (for example, less than or equal to 850 m), refer to FIG. 6. A channel between the terminal and the network device meets a spherical wave assumption, and no longer meets a plane wave assumption.

3. Spatial Angle Information and Spatial Depth Information

Figure 6:
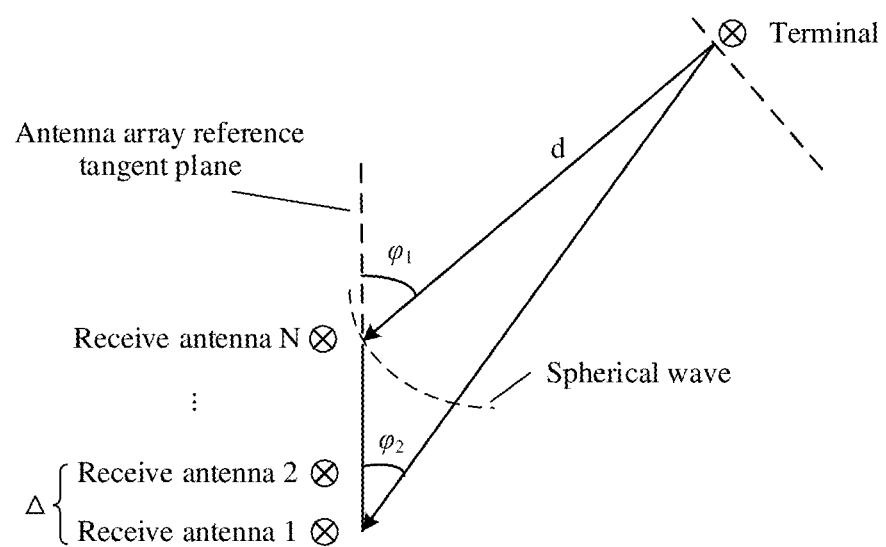
FIG. 6 is a schematic diagram of a spherical wave according to an embodiment of this application.

A spatial angle refers to an included angle between an antenna array reference tangent plane and a coordinate point in free space. A spatial depth refers to a straight-line distance between an array reference point and a coordinate point in free space. The antenna array reference tangent plane refers to a tangent plane corresponding to the array reference point. The array reference point refers to a fixed point (for example, a first antenna in an array or a last antenna in the array) in a panel. Refer to FIG. 5 and FIG. 6. An example in which the array reference point is a receive antenna N is used, and the spatial depth is d in the figure. FIG. 5 and FIG. 6 further show a location of the antenna array reference tangent plane.

4. Steering Vector

A steering vector is a vector formed by N phase amplitude values corresponding to N antenna elements when an electromagnetic wave propagates to the N (N is an integer greater than 0) antenna elements in an antenna array, and may also be referred to as an array steering vector or an antenna array steering vector.

It should be noted that an antenna port group steering vector in this application is a steering vector including spatial depth information. A special example is a spherical wave steering vector (that is, a vector formed by N corresponding phase amplitude values when a spherical wave propagates to the N antenna elements in the antenna array), but the steering vector is not limited to the spherical wave steering vector.

5. Quantization Level Set

Quantization refers to discretization of continuous values, that is, a group of specified levels is used to represent continuous values by using closest level values. A set of these level values may be referred to as a quantization level set, and a quantity of these level values may be referred to as a quantization level quantity.

Figure 7:
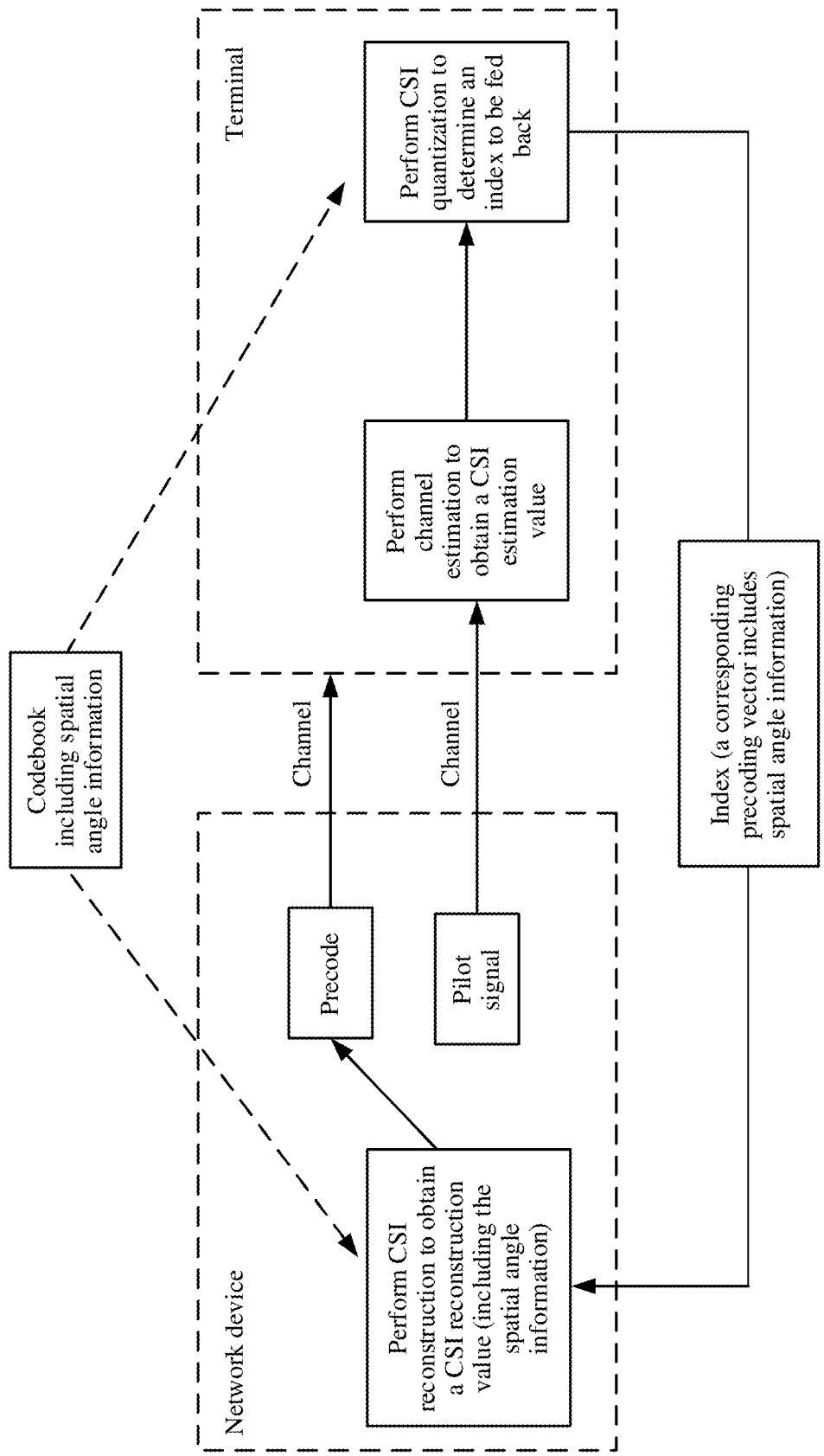
FIG. 7 is a flowchart of a method for obtaining a CSI reconstruction value according to an embodiment of this application.
Figure 8:
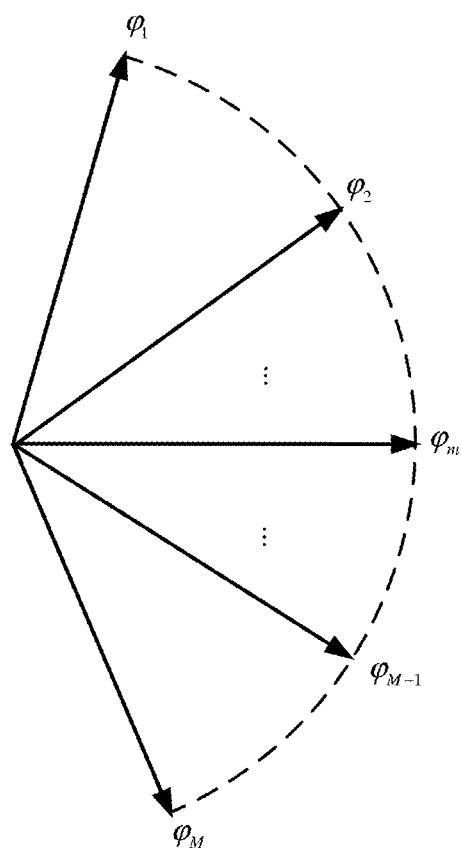
FIG. 8 is a schematic diagram of spatial angle quantization according to an embodiment of this application.

Based on the foregoing understanding of the plane wave and the spherical wave, if the terminal is far enough away from the network device, refer to FIG. 5. The channel between the terminal and the network device meets a plane wave assumption, and an existing codebook design considers that the channel between the terminal and the network device meets the plane wave assumption. Therefore, a precoding vector in the existing codebook includes only spatial angle information. In this case, for a method for obtaining a CSI reconstruction value (which may also be referred to as a precoding weight) by the network device, refer to FIG. 7. Further, refer to FIG. 8. In a codebook construction process, the spatial angle information may be quantized. If the quantization level quantity of the spatial angle is M (M is an integer greater than 0), the network device may perform multiplex transmission of data of a maximum of M terminals by using the spatial angle information. In this application, m is an integer greater than 0 and less than or equal to M.

For example, an existing codebook (denoted as C) includes N-dimensional orthogonal discrete Fourier transform (discrete fourier transform, DFT) basis vectors, as shown in the following formula:

$$C = \left\{ q_m = N^{-0.5} \begin{bmatrix} e^{-j2\pi(0)mN^{-1}} \\ e^{-j2\pi(1)mN^{-1}} \\ \vdots \\ e^{-j2\pi(N-1)mN^{-1}} \end{bmatrix}, m \in [1, N] \right\}$$

N represents an antenna element quantity, and $q_m$ represents an $m^{th}$ DFT basis vector in C.

During design of an existing codebook, it is considered that a channel between a terminal and a network device meets a plane wave assumption. In other words, an existing codebook technology is essentially quantization and approximation of a steering vector under a plane wave assumption, and mainly reflects spatial angle information of a channel. As massive MIMO continues to evolve to an extremely large aperture array (extremely large aperture array, ELAA), the antenna element quantity and the antenna array aperture continuously increase. It can be learned from $R=2L^2\lambda^{-1}$ that a channel reflects a spherical wave characteristic, and no longer meets a plane wave assumption. The existing codebook design causes a large deviation between an obtained CSI reconstruction value and a CSI truth value. This reduces a spatial multiplexing gain, an array gain, and the like of massive MIMO.

To resolve this problem, this application provides a communication method. Spatial depth information is introduced when a codebook is determined, so that a CSI reconstruction value can match a spherical wave channel characteristic. In this way, a spatial multiplexing gain and an array gain of an ELAA are maximized. In the following formulas of this application, "$A^H$" represents "a complex conjugate apparatus of a matrix A", "|A|" represents "a determinant of a positive definite Hermitian matrix A", "A-" represents "an inverse of a matrix A", "Ail" represents "a modulus value of a vector A", "I" represents an identity matrix, and "*" represents "multiplication". A may be replaced with a parameter in a corresponding formula below.

Figure 9:
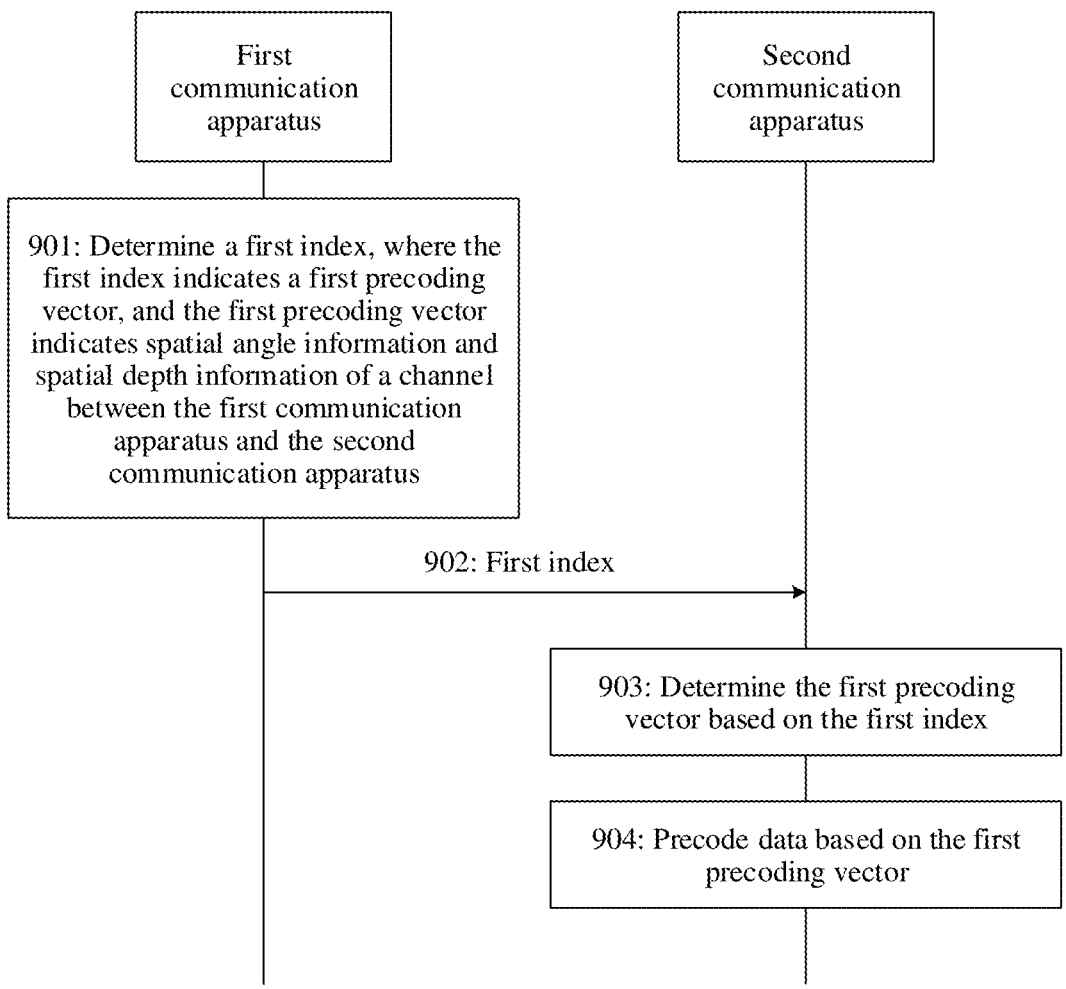
FIG. 9 is a flowchart of a communication method according to an embodiment of this application.

Refer to FIG. 9. The method includes the following steps.

901: A first communication apparatus determines a first index, where the first index indicates a first precoding vector, and the first precoding vector includes spatial angle information and spatial depth information of a channel between the first communication apparatus and a second communication apparatus.

The method provided in this application may be applied to an uplink communication system. In this case, the first communication apparatus may be a terminal, and the second communication apparatus may be a network device. Alternatively, the method may be applied to a downlink communication system. In this case, the first communication apparatus may be a network device, and the second communication apparatus may be a terminal.

The first precoding vector is any precoding vector in a codebook. Each precoding vector in the codebook corresponds to one index.

Optionally, the codebook to which the first precoding vector belongs is obtained by sampling an antenna port group steering vector of the second communication apparatus by using a quantization level set of a spatial depth of the channel and a quantization level set of a spatial angle of the channel.

Optionally, the antenna port group steering vector is determined based on the spatial depth of the channel, the spatial angle of the channel, and an antenna port group-related parameter of the second communication apparatus. The antenna port group-related parameter includes one or more of antenna port spacing (that is, antenna element spacing), an antenna port quantity (that is, an antenna element quantity), or a spatial arrangement of antenna ports (that is, a spatial arrangement of antenna elements).

Optionally, the quantization level set of the spatial depth of the channel is determined based on prior statistical information of the channel and an allowed quantity of bits for quantization. The prior statistical information includes: a maximum value of the spatial depth of the channel and a minimum value of the spatial depth of the channel, or an average value of spatial depths of the channel and a variance of spatial depths of the channel, or a probability distribution function of the spatial depth of the channel.

Figure 10:
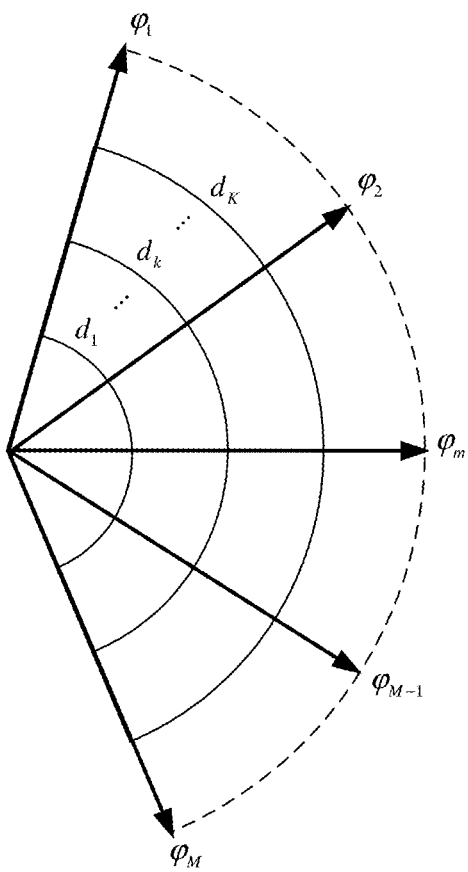
FIG. 10 is a schematic diagram of quantization of spatial angle and spatial depth quantization according to an embodiment of this application.

For a schematic diagram of quantizing the spatial depth and the spatial angle of the channel, refer to FIG. 10.

Optionally, the codebook includes K×M precoding vectors, each precoding vector is an N-dimensional vector, K is a quantization level quantity of the spatial depth of the channel, M is a quantization level quantity of the spatial angle of the channel, N is an antenna quantity (physical antenna quantity, antenna port quantity, or antenna element quantity) of the second communication apparatus, and K, M, and N are all integers greater than 0.

Each precoding vector in the codebook includes a spatial depth component and a spatial angle component. The spatial depth component indicates the spatial depth information, and the spatial angle component indicates the spatial angle information. An index corresponding to a precoding vector may include two parts: an index indicating the spatial depth information (or the spatial depth component) and an index indicating the spatial angle information (or the spatial angle component). In other words, the index corresponding to the precoding vector may be a two-dimensional index, or certainly may be a one-dimensional index. This is not limited in this application.

During implementation, step 901 may include: The first communication apparatus receives a pilot signal, performs channel estimation based on the pilot signal and obtains a CSI estimation value, and determines the first index in the codebook based on the CSI estimation value. A process of determining the first index in the codebook based on the CSI estimation value may be referred to as CSI quantization.

Optionally, step 901 may be specifically implemented in any one of the following Manner 1 to Manner 4.

Manner 1: The first communication apparatus matches the codebook with an obtained CSI estimation value, to determine an index corresponding to a precoding vector that meets a matching degree requirement as the first index.

Scenario to which Manner 1 is applicable: single-user MIMO (Single-User MIMO, SU-MIMO) scenario, where the first communication apparatus is a single-antenna apparatus, and the first communication apparatus has only one layer of data stream (that is, a rank (Rank) of the first communication apparatus is 1); or SU-MIMO scenario, where the first communication apparatus is a multi-antenna apparatus, and the first communication apparatus has only one layer of data stream.

In Manner 1 to Manner 4, the precoding vector that meets the matching degree requirement may be one or more precoding vectors with a highest matching degree, one or more precoding vectors whose matching degree is greater than a threshold, or one or more precoding vectors that meet another matching degree requirement. This is not limited in this application.

In Manner 1, the first communication apparatus may feed back one index, or may feed back a plurality of indexes. If the first communication apparatus feeds back one index, the first index is one index. If the first communication apparatus feeds back a plurality of index, the first index includes a plurality of indexes.

In Manner 1, optionally, if the first index includes a plurality of indexes, the first communication apparatus may further feed back a corresponding coefficient for each index in the first index. Specific implementation is similar to that in a conventional technology, and details are not described again.

Manner 2: The first communication apparatus matches the codebook with an obtained CSI estimation value and a noise statistics covariance matrix, to determine an index corresponding to a precoding vector that meets a matching degree requirement as the first index.

Scenario to which Manner 2 is applicable: SU-MIMO, where the first communication apparatus is a multi-antenna apparatus, and the first communication apparatus has only one layer of data stream.

In Manner 2, the first communication apparatus may feed back one index, or may feed back a plurality of indexes. If the first communication apparatus feeds back one index, the first index is one index. If the first communication apparatus feeds back a plurality of index, the first index includes a plurality of indexes.

In Manner 2, optionally, if the first index includes a plurality of indexes, the first communication apparatus may further feed back a corresponding coefficient for each index in the first index. Specific implementation is similar to that in a conventional technology, and details are not described again.

The noise statistics covariance matrix in this application may be an additive noise statistics covariance matrix. In Manner 2 and Manner 4 below, when the first communication apparatus performs multi-antenna reception, the first communication apparatus is usually interfered with by another user (for example, inter-cell interference of a neighboring station). In this case, the noise is usually spatial colored noise, and the colored noise causes an offset of a spatial angle and a spatial depth of a channel. By using a noise statistics covariance matrix, an index of an obtained codebook can reflect an equivalent spatial angle and spatial depth that are offset after being affected by the colored noise, so that a corresponding precoding vector can match a channel characteristic to a maximum extent, to obtain a maximum precoding gain and rate.

Manner 3: The first communication apparatus matches the codebook with an obtained CSI estimation value, to determine indexes corresponding to L precoding vectors that meet a matching degree requirement as the first index.

In this case, the first index includes L sub-indexes, where L represents a quantity of spatial multiplexing layers of the first communication apparatus, and L is an integer greater than 1.

Scenario to which Manner 3 is applicable: SU-MIMO, where the first communication apparatus is a multi-antenna apparatus, and the first communication apparatus has a plurality of layers of data streams (that is, a Rank of the first communication apparatus is greater than 1).

Manner 4: The first communication apparatus matches the codebook with an obtained CSI estimation value and a noise statistics covariance matrix, to determine indexes corresponding to L precoding vectors that meet a matching degree requirement as the first index. The first index includes L sub-indexes, where L represents a quantity of spatial multiplexing layers of the first communication apparatus, and L is an integer greater than 1.

A scenario to which Manner 4 is applicable is the same as that of Manner 3.

In Manner 1 to Manner 4, a method for matching a CSI estimation value with a precoding vector in the codebook may be determined based on a specific system performance indicator, and includes but is not limited to methods such as "correlation matching between a CSI estimation value and a CSI codebook vector" and "sum rate maximization matching".

902: The first communication apparatus sends the first index to the second communication apparatus. Correspondingly, the second communication apparatus receives the first index from the first communication apparatus.

If the first communication apparatus is a terminal, the first index may be carried on a physical uplink control channel (PUCCH) or a physical uplink shared channel (PUSCH).

903: The second communication apparatus determines the first precoding vector based on the first index.

904: The second communication apparatus precodes data based on the first precoding vector.

During specific implementation, step 904 may include: The second communication apparatus performs CSI reconstruction based on the first precoding vector to obtain a CSI reconstruction value, and precoding data based on the CSI reconstruction value. The data herein may be data in an SU-MIMO scenario, or may be data in a multi-user MIMO (Multi-User, MU-MIMO) scenario.

During specific implementation of step 904, if the second communication apparatus is a network device, for an SU-MIMO scenario, the first precoding vector is the CSI reconstruction value. For an MU-MIMO scenario, there are a plurality of terminals. Because each terminal reports an index, the network device needs to perform CSI reconstruction on precoding vectors corresponding to indexes received from the plurality of terminals, to determine the CSI reconstruction value, and precodes data by using the CSI reconstruction value.

If there are a plurality of first communication apparatuses (that is, in an MU-MIMO scenario), optionally, multiplex transmission with the plurality of first communication apparatuses may be performed, which specifically includes:

(11) The second communication apparatus separately receives indexes from S-1 first communication apparatuses other than the first communication apparatus, where S is an integer greater than 1.

When precoding vectors corresponding to S1 indexes in S indexes have a same spatial angle component but different spatial depth components, step (12) is performed. When precoding vectors corresponding to S2 indexes in S indexes have different spatial angle components and different spatial depth components, step (13) is performed. Alternatively, spatial angle components of precoding vectors are not distinguished. When precoding vectors corresponding to S3 indexes in S indexes have different spatial depth components, step (14) is directly performed.

(12) The second communication apparatus performs multiplex transmission with S1 first communication apparatuses based on the spatial depth components of the precoding vectors corresponding to the S1 indexes, where the S1 indexes are a part or all of the S indexes, the S indexes are indexes received by the second communication apparatus from the first communication apparatus and the S-1 first communication apparatuses, the S1 first communication apparatuses are first communication apparatuses that report the S1 indexes, and S1 is an integer greater than 1 and less than or equal to S.

(13) The second communication apparatus performs multiplex transmission with S2 first communication apparatuses based on the spatial depth components and/or the spatial angle components of the precoding vectors corresponding to the S2 indexes, where the S2 indexes are a part or all of the S indexes, the S indexes are indexes received by the second communication apparatus from the first communication apparatus and the S-1 first communication apparatuses, the S2 first communication apparatuses are first communication apparatuses that report the S2 indexes, and S2 is an integer greater than 1 and less than or equal to S.

(14) When precoding vectors corresponding to S3 indexes of S indexes have different spatial depth components, the second communication apparatus performs multiplex transmission with S3 first communication apparatuses based on the spatial depth components of the precoding vectors corresponding to the S3 indexes, where the S3 indexes are a part or all of the S indexes, the S indexes are indexes received by the second communication apparatus from the first communication apparatus and the S-1 first communication apparatuses, the S3 first communication apparatuses are first communication apparatuses that report the S3 indexes, and S3 is an integer greater than 1 and less than or equal to S.

It should be noted that, before multiplex transmission of a plurality of terminals is performed, pairing and screening of the plurality of first communication apparatuses may be first performed based on an overlapping degree of CSI reconstruction values of S first communication apparatuses. For example, a plurality of first communication apparatuses with a same spatial angle component but different spatial depth components may be paired, a plurality of first communication apparatuses with different spatial angle components but a same spatial depth component may be paired, or a plurality of first communication apparatuses with different spatial angle components and different spatial depth components may be paired. The plurality of paired first communication apparatuses may perform multiplex transmission.

If there is a single first communication apparatus (that is, in an SU-MIMO scenario), optionally, multiplex transmission of a plurality of layers of data streams of the single first communication apparatus may be performed based on a spatial depth component. In this case, the first index includes a plurality of indexes. The multiplex transmission specifically includes: When precoding vectors corresponding to the plurality of indexes in the first index have different spatial depth components, the second communication apparatus performs multiplex transmission of a plurality of layers of data streams of the first communication apparatus based on the spatial depth components of the precoding vectors corresponding to the plurality of indexes in the first index.

That is, when multiplex transmission of data is performed based on a spatial depth component, the data may be intra-user multiple streams in SU-MIMO, or may be inter-user multiple streams in MU-MIMO.

According to the method provided in this embodiment of this application, spatial depth information is introduced during codebook determining, so that a channel can be determined from dimensions of spatial angle and spatial depth, and a precoding vector corresponding to an index fed back by the first communication apparatus can match a spherical wave channel characteristic. In other words, a CSI reconstruction value obtained by the second communication apparatus based on the precoding vector corresponding to the index fed back by the first communication apparatus is closer to a CSI truth value. In this way, a spatial multiplexing gain and an array gain of an ELAA are maximized.

In addition, when precoding vectors corresponding to indexes sent by different first communication apparatuses have different spatial depth components, the second communication apparatus may distinguish, based on the indexes, a spatial depth difference between channels of different first communication apparatuses, and perform multiplex transmission of data based on the spatial depth difference. In other words, the second communication apparatus may allocate data streams of different layers based on different spatial depth components. This improves a total quantity of spatial multiplexing layers and system capacity of SU-MIMO or MU-MIMO. For example, in a heavy-load service scenario in which users are densely distributed, Q (Q is an integer greater than 1) users that cannot be identified and multiplexed based on a spatial angle may be identified and multiplexed based on a spatial depth. This improves capacity by Q times.

Figure 11:
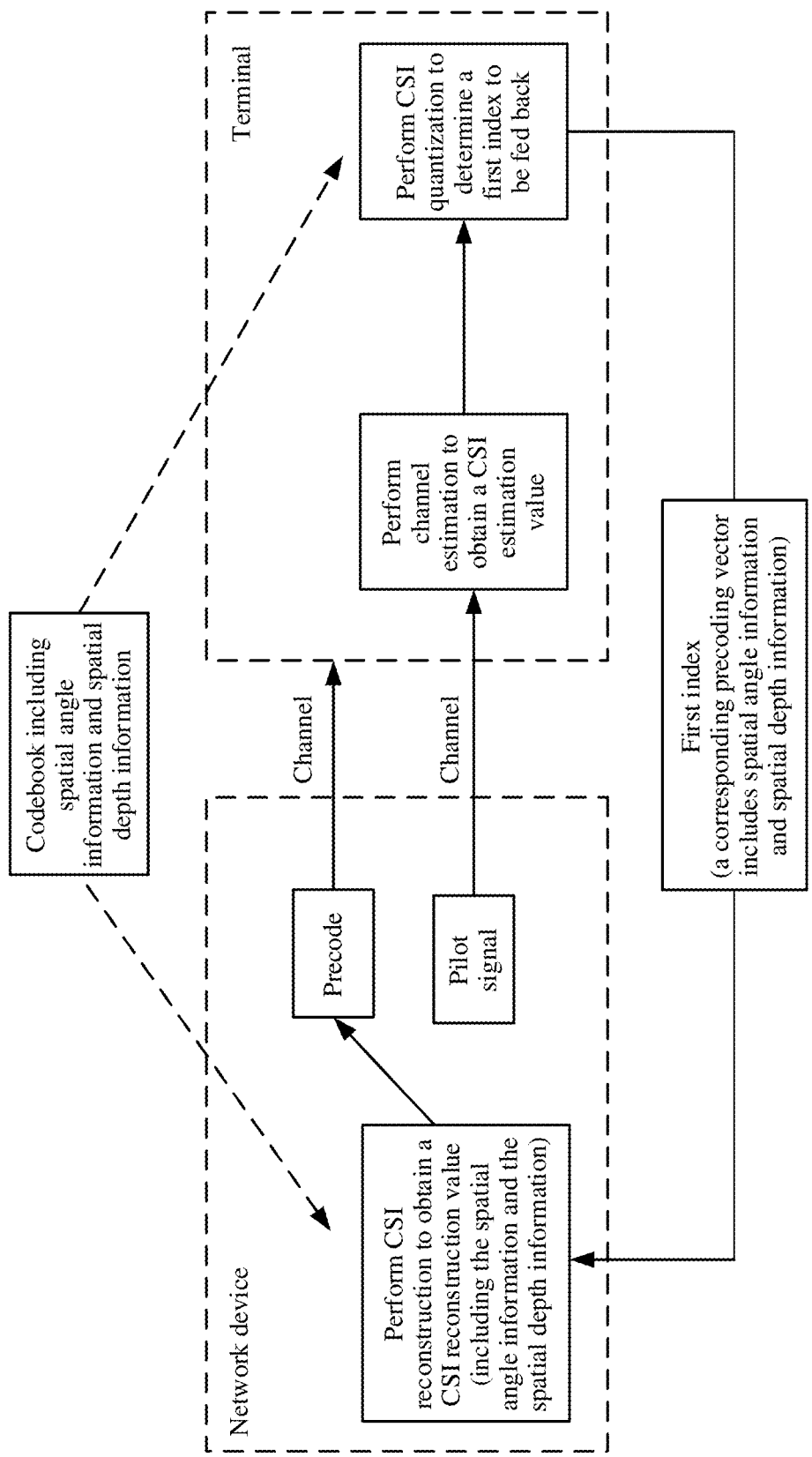
FIG. 11 is a flowchart of another method for obtaining a CSI reconstruction value according to an embodiment of this application.

For an overall implementation procedure of the method shown in FIG. 9, refer to FIG. 11.

In the foregoing embodiment, a method for constructing a codebook may include the following steps.

Step 1: Obtain prior statistical information related to a spatial depth of a channel.

The prior statistical information includes but is not limited to: a maximum value of the spatial depth of the channel and a minimum value of the spatial depth of the channel, or an average value of spatial depths of the channel and a variance of spatial depths of the channel, or a probability distribution function (accurate or approximate) of the spatial depth of the channel.

The prior statistical information may be determined according to methods such as a range of activity of a terminal in a cell, a coverage radius of the cell, a path loss model, or a channel actual measurement. For example, the maximum value of the spatial depth of the channel may be the coverage radius of the cell.

Step 2: Determine a quantization level set of the spatial depth of the channel based on the prior statistical information of the channel and an allowed quantity of bits for quantization.

The allowed quantity of bits for quantization is a quantity of bits allowed to be used when spatial depth information is fed back. The allowed quantity of bits for quantization may be preset or predefined, determined through negotiation between a first communication apparatus and a second communication apparatus, or specified in a protocol. This is not limited in this application.

Specifically, based on the prior statistical information of the channel and the allowed quantity of bits for quantization, the quantization level set of the spatial depth of the channel is determined by using methods such as uniform quantization and Lloyd quantization.

The following describes implementation of the second step in different cases by using examples.

Case 1: The prior statistical information includes the maximum value (denoted as dmax) of the spatial depth of the channel and the minimum value (denoted as dmin) of the spatial depth of the channel.

In Case 1, if uniform quantization is used, the quantization level set of the spatial depth may be $$d_k = d_{min} + k\left(\frac{d_{max} - d_{min}}{2^{N_d}}\right),$$

where $k \in [1, K]$, $K=2^{N_d}$. $d_k$ represents a $k^{th}$ quantization level value and k is an integer, $N_d$ represents an allowed quantity of bits for quantization, and $K=2^{N_d}$ represents a total quantity of quantization levels.

It may be understood that the spatial depth is evenly divided into K parts by quantizing the spatial depth.

Case 2: The average value (denoted as $\mu_d$) of spatial depths of the channel and the variance (denoted as $\sigma_d^2$) of spatial depths of the channel.

In Case 2, if uniform quantization is used, the quantization level set of the spatial depth may be:

$$d_k = \mu_d + k\frac{2\beta\sigma_d^2}{2^{N_d}},$$

where $k \in [1, K]$, $K=2^{N_d}$. $\beta$ is a correction factor, which may be set based on an empirical or simulated value.

Case 3: The prior statistical information includes the probability distribution function of the spatial depth of the channel.

In Case 3, if Lloyd quantization is used, an output result $\{d_k\}$ of the quantization level set may be obtained by using a spatial depth probability distribution function p(x) and a quantization level quantity $K=2^{N_d}$ as input parameters, where $k \in [1, K]$, $K=2^{N_d}$.

Step 3: Determine a quantization level set of the spatial angle of the channel.

For example, an angle interval $[0, 2\pi]$ may be uniformly quantized. A quantization level set of the spatial angle may be denoted as $\varphi_m$, where $m \in [1, M]$, $M=2^{N_\varphi}$. $N_\varphi$ represents an allowed quantization level quantity of the spatial angle, and M is a total quantization level quantity of the spatial angle.

A method for determining the quantization level set of the spatial angle of the channel is well known by a person skilled in the art, and details are not described again.

Step 4: Determine an antenna port group steering vector.

For example, an antenna array is a linear array with equal antenna element spacing, and an N-dimensional antenna port group steering vector may be expressed by Formula 1:

$$f(\varphi, d) = N^{-0.5} \begin{bmatrix} e^{-j2\pi\lambda^{-1}\left(\sqrt{(\Delta 0)^2 + d^2 + 2(\Delta 0)d\cos\varphi} - d\right)} \\ e^{-j2\pi\lambda^{-1}\left(\sqrt{(\Delta 1)^2 + d^2 + 2(\Delta 1)d\cos\varphi} - d\right)} \\ \vdots \\ e^{-j2\pi\lambda^{-1}\left(\sqrt{(\Delta(N-1))^2 + d^2 + 2(\Delta(N-1))d\cos\varphi} - d\right)} \end{bmatrix} \quad \text{(Formula 1)}$$

$\Delta$ represents element spacing, N represents an antenna element quantity, $\varphi$ represents a spatial angle, d represents a spatial depth, and X represents a carrier wavelength.

Step 5: Sample the antenna port group steering vector by using the quantization level set of the spatial depth of the channel and the quantization level set of the spatial angle of the channel, to obtain a codebook that includes the spatial depth information of the channel and the spatial angle information of the channel.

The codebook (denoted as C) may be expressed by Formula 2:

$$C = \left\{ q_{m,k} = f(\varphi_m, d_k), \left\langle \begin{matrix} k \in [1, K] \\ m \in [1, M] \end{matrix} \right\rangle \right\} \quad \text{(Formula 2)}$$

$$f(\varphi_m, d_k) = N^{-0.5} \begin{bmatrix} e^{-j2\pi\lambda^{-1}\left(\sqrt{(\Delta 0)^2 + d_k^2 + 2(\Delta 0)d_k\cos\varphi_m} - d_k\right)} \\ e^{-j2\pi\lambda^{-1}\left(\sqrt{(\Delta 1)^2 + d_k^2 + 2(\Delta 1)d_k\cos\varphi_m} - d_k\right)} \\ \vdots \\ e^{-j2\pi\lambda^{-1}\left(\sqrt{(\Delta(N-1))^2 + d_k^2 + 2(\Delta(N-1))d_k\cos\varphi_m} - d_k\right)} \end{bmatrix}$$

An $n^{th}$ element in the vector $f(\varphi_m, d_k)$ is $f(\varphi_m, d_k, n) =$ $$f(\varphi_m, d_k, n) = N^{-0.5} e^{-j2\pi\lambda^{-1}\left(\sqrt{(\Delta n)^2 + d_k^2 + 2(\Delta n)d_k\cos\varphi_m} - d_k\right)},$$

n is an integer greater than or equal to 0 and less than N.

$q_{m,k}$ represents a precoding vector whose spatial depth component is $d_k$ and whose spatial angle component is Wm in the codebook. A size of the codebook is K×M. Each precoding vector is an N-dimensional vector. Refer to FIG. 10. The codebook has a sector lattice quantization characteristic, and each precoding vector corresponds to one $d_k$ and one $\varphi_m$.

To reduce complexity of constructing the codebook, complexity of searching for the precoding vector of the first communication apparatus, and complexity of precoding of the second communication apparatus, the codebook may be constructed based on an approximate or simplified calculation formula of the antenna port group steering vector function. For example, Formula 1 in Step 4 includes a square root operation. For simplicity, Formula 1 may be approximated by two-order series, and the approximated formula is:

$$f(\varphi, d) \approx N^{-0.5} \begin{bmatrix} e^{-j2\pi\lambda^{-1}\left((\Delta 0)\cos\varphi + \frac{(\Delta n)^2 \sin^2\varphi}{2d}\right)} \\ e^{-j2\pi\lambda^{-1}\left((\Delta 1)\cos\varphi + \frac{(\Delta n)^2 \sin^2\varphi}{2d}\right)} \\ \vdots \\ e^{-j2\pi\lambda^{-1}\left((\Delta(N-1))\cos\varphi + \frac{(\Delta n)^2 \sin^2\varphi}{2d}\right)} \end{bmatrix}$$

Correspondingly, Formula 2 may be constructed according to the following simplified method:

$$C = \left\{ q_{m,k} = f(\varphi_m, d_k) = N^{-0.5} \begin{bmatrix} e^{-j2\pi\lambda^{-1}\left((\Delta 0)\cos\varphi_m + \frac{(\Delta n)^2 \sin^2\varphi_m}{2d_k}\right)} \\ e^{-j2\pi\lambda^{-1}\left((\Delta 1)\cos\varphi_m + \frac{(\Delta n)^2 \sin^2\varphi_m}{2d_k}\right)} \\ \vdots \\ e^{-j2\pi\lambda^{-1}\left((\Delta(N-1))\cos\varphi_m + \frac{(\Delta n)^2 \sin^2\varphi m}{2d_k}\right)} \end{bmatrix}, \left\langle \begin{matrix} k \in [1, K] \\ m \in [1, M] \end{matrix} \right\rangle \right\}$$

The codebook determined by using the foregoing method may be stored in the first communication apparatus and the second communication apparatus for subsequent use.

An example in which the first communication apparatus is a terminal and the second communication apparatus is a network device is used below to describe implementation processes of the network device and the terminal based on the foregoing codebook.

Figure 12:
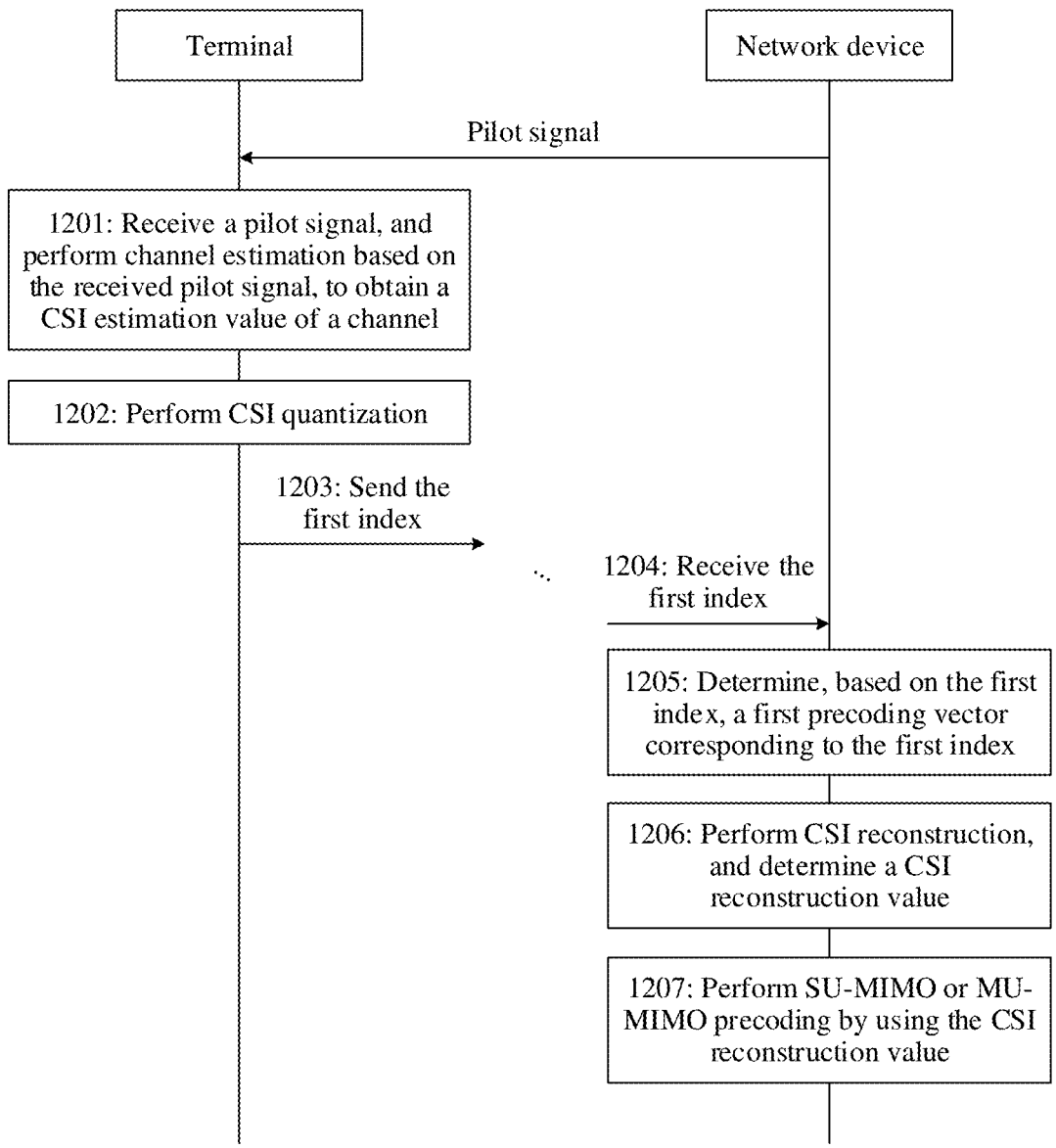
FIG. 12 is a flowchart of another communication method according to an embodiment of this application.

An implementation procedure of the terminal mainly includes channel estimation, CSI quantization, and feedback of a first index. Refer to FIG. 12, the procedure specifically includes the following steps.

1201: The terminal receives a pilot signal from the network device, and performs channel estimation based on the received pilot signal, to obtain a CSI estimation value of a channel.

The CSI estimation value may be denoted as $\hat{H}$, and $\hat{H}$ is a $N_R \times N$ matrix, where $N_R$ is a quantity of receive antennas of the terminal, and $N_R$ is an integer greater than 0. When $N_R$ is equal to 1, H may be denoted as h.

1202: The terminal performs CSI quantization.

Specifically, the terminal matches a codebook with the CSI estimation value, and determines an index corresponding to a precoding vector that meets a matching degree requirement as a first index.

For example, the terminal matches each precoding vector in the codebook with the CSI estimation value, and determines one or more indexes with a highest matching degree as the first index.

When the terminal performs single-antenna reception, an example of the matching method based on correlation between the CSI estimation value and the codebook is as follows:

$$(I_\varphi, I_d) = \arg \max_{m \in [1,M], k \in [1,K]} \|\hat{h}^H q_{m,k}\| \quad \text{(Formula 3)}$$

$\hat{h}^H$ represents a CSI estimation value of a channel between a multi-antenna network device and a single-antenna terminal, and is an N-dimensional row vector. $q_{m,k}$ represents a precoding vector whose spatial depth component is $d_k$ and whose spatial angle component is $\varphi_m$ in the codebook. $\|\hat{h}^H q_{m,k}\|$ represents a modulus value of $\hat{h}^H q_{m,k}$. $(I_\varphi, I_d)$ is a first index, and a first precoding vector corresponding to the first index is $q_{I_\varphi, I_d}$.

When the terminal performs single-antenna reception, a noise statistics covariance matrix is a unit matrix. Therefore, the noise statistics covariance matrix may not be considered.

When the terminal performs multi-antenna reception, the terminal is usually interfered with by another user (for example, inter-cell interference of a neighboring station). In this case, the noise is usually spatial colored noise. That is, the noise statistics covariance matrix is no longer a unit matrix, but reflects a strength difference in different spatial feature directions. That is, the noise has spatial directivity. When the first index is determined by using Formula 3, a performance loss is introduced. In addition, when the terminal performs multi-antenna reception, if a quantity L of spatial multiplexing layers is greater than 1, the first index includes L sub-indexes. In this case, a codebook index may be retrieved by using a matching method of sum rate maximization, to ensure that an array gain is maximized.

When L=1, a specific method is as follows:

$$(I_\varphi, I_d) = \arg \max_{m \in [1,M], k \in [1,K]} |q_{m,k}^H \hat{H}^H R_{zz}^{-1} \hat{H} q_{m,k} + I| \quad \text{(Formula 4)}$$

$R_{zz}$ represents an $N_R \times N_R$ noise statistics covariance matrix of a terminal receiver, which may be obtained through estimation by using a conventional pilot measurement technology, $R_{zz}^{-1}$ represents an inverse of a matrix, I represents an identity matrix, and $|q_{m,k}^H \hat{H}^H R_{zz}^{-1} \hat{H} q_{m,k} + I|$ represents a determinant of $q_{m,k}^H \hat{H}^H R_{zz}^{-1} \hat{H} q_{m,k} + I$. For meanings of other parameters, refer to the foregoing descriptions. The noise statistics covariance matrix in this application may be an additive noise statistics covariance matrix.

When L is greater than 1, the first index may also be determined according to the foregoing Formula 4. Specifically, the terminal may determine the L sub-indexes according to an iteration method. That is, when an $(l+1)^{th}$ sub-index is determined, autocorrelation matrices corresponding to precoding vectors corresponding to first l sub-indexes are added to $R_{zz}$ as interference items, and then the $(l+1)^{th}$ sub-index is calculated according to Formula 4. 1 is an integer greater than or equal to 0 and less than L.

The colored noise causes an offset of a spatial angle and a spatial depth of a channel. By using a noise statistics covariance matrix, an index of an obtained codebook can reflect an equivalent spatial angle and spatial depth that are offset after being affected by the colored noise, so that a corresponding precoding vector can match a channel characteristic to a maximum extent, to obtain a maximum precoding gain and rate.

1203: The terminal sends the first index to the network device.

Specifically, the terminal may send the first index to the network device in a signaling manner by using an uplink channel.

An implementation procedure of the network device mainly includes first index receiving, CSI reconstruction, and SU-MIMO or MU-MIMO precoding by using a CSI reconstruction value obtained through CSI reconstruction. Refer to FIG. 12. The procedure specifically includes the following steps.

1204: The network device receives the first index from the terminal.

1205: The network device determines, based on the first index, a precoding vector (namely, the first precoding vector) corresponding to the first index.

During specific implementation of step 1205, the network device may determine the first precoding vector in the codebook based on the first index.

1206: The network device performs CSI reconstruction, to determine the CSI reconstruction value.

In an example of a multi-antenna network device and a single-antenna terminal, the network device may use the first precoding vector as the CSI reconstruction value. In this case, $\hat{h}^H = q_{I_\varphi, I_d}^H$. $\hat{h}^H$ represents a CSI estimation value of a channel between the multi-antenna network device and the single-antenna terminal, and is an N-dimensional row vector. $q_{I_\varphi, I_d}$ is the first precoding vector.

1207: The network device performs SU-MIMO or MU-MIMO precoding by using the CSI reconstruction value.

Using SU-MIMO and a single-antenna terminal as an example, data after precoding may be expressed as $\tilde{x}=wx$, $w=h$. w represents the CSI reconstruction value, and is an N-dimensional column vector. x represents a single-stream data symbol, and k represents a vector after precoding.

Using MU-MIMO and a single-antenna terminal as an example, data after zero-forcing (Zero-Forcing, ZF) precoding may be expressed as:

$$\tilde{x} = w \begin{bmatrix} x_1 \\ x_2 \\ \vdots \\ x_{N_\mu} \end{bmatrix}, \langle W = H^H(HH^H)^{-1}, H = \begin{bmatrix} \hat{h}_1^H \\ \hat{h}_2^H \\ \vdots \\ \hat{h}_{N_\mu}^H \end{bmatrix} \rangle$$

$N_\mu$ represents a total quantity of spatial multiplexing users (that is, a quantity of terminals), H represents an equivalent channel matrix of $N_\mu \times N$ dimensions in which N row vectors are concatenated by row, each row vector is a CSI estimation value of a terminal, W represents a $N \times N_\mu$ ZF CSI reconstruction value corresponding to H, $x_n$ represents a single-stream data symbol of an $n^{th}$ user, and $\tilde{x}$ represents a vector after precoding.

It should be noted that, in addition to the spatial depth information and the spatial angle information, the codebook may further include polarization information. For content of the polarization information, refer to a conventional technology. Details are not described again.

The foregoing mainly describes the solutions in embodiments of this application from a perspective of interaction between network elements. It may be understood that, to implement the foregoing functions, each network element, for example, the first communication apparatus and the second communication apparatus, includes at least one of a corresponding hardware structure or software module for performing each function. A person skilled in the art should be easily aware that, in combination with units and algorithm steps of the examples described in embodiments disclosed in this specification, this application can be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the first communication apparatus and the second communication apparatus may be divided into functional units based on the foregoing method examples. For example, each functional unit may be obtained through division based on each corresponding function, or two or more functions may be integrated into one processing unit. The integrated unit may be implemented in a form of hardware, or may be implemented in a form of a software functional unit. It should be noted that, in embodiments of this application, division into the units is an example, and is merely a logical function division. In actual implementation, another division manner may be used.

Figure 13:
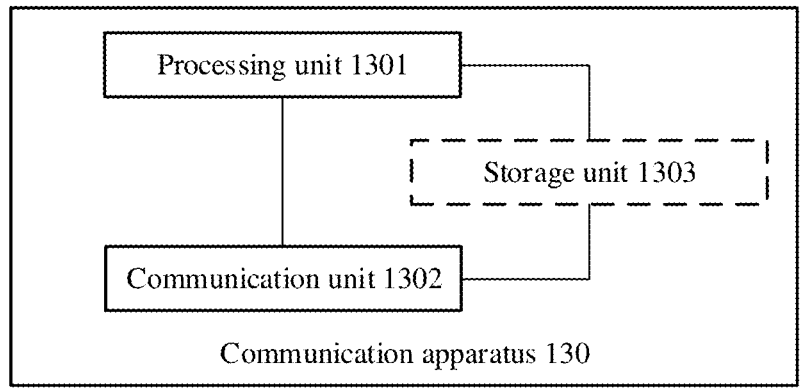
FIG. 13 is a schematic diagram of composition of a communication apparatus according to an embodiment of this application.

FIG. 13 is a schematic diagram of a possible structure of the communication apparatus (denoted as a communication apparatus 130) in the foregoing embodiments when the integrated unit is used. The communication apparatus 130 includes a processing unit 1301 and a communication unit 1302, and may further include a storage unit 1303. The schematic diagram of structure shown in FIG. 13 may be used to show structures of the first communication apparatus and the second communication apparatus in the foregoing embodiments.

When the schematic diagram of structure shown in FIG. 13 is used to show the structure of the first communication apparatus in the foregoing embodiments, the processing unit 1301 is configured to control and manage actions of the first communication apparatus. For example, the processing unit 1301 is configured to perform 901 and 902 in FIG. 9, 1201 to 1203 in FIG. 12 (in this case, the first communication apparatus is a terminal), and/or an action performed by the first communication apparatus in another process described in embodiments of this application. The processing unit 1301 may communicate with another network entity through the communication unit 1302, for example, communicate with the second communication apparatus shown in FIG. 9. The storage unit 1303 is configured to store program code and data that are of the first communication apparatus.

When the schematic diagram of structure shown in FIG. 13 is used to show the structure of the first communication apparatus in the foregoing embodiments, the communication apparatus 130 may be a device (for example, a terminal), or may be a chip in the device.

When the schematic diagram of structure shown in FIG. 13 is used to show the structure of the second communication apparatus in the foregoing embodiments, the processing unit 1301 is configured to control and manage actions of the second communication apparatus. For example, the processing unit 1301 is configured to perform 902 to 904 in FIG. 9, 1204 to 1207 in FIG. 12 (in this case, the second communication apparatus is a network device), and/or an action performed by the second communication apparatus in another process described in embodiments of this application. The processing unit 1301 may communicate with another network entity through the communication unit 1302, for example, communicate with the first communication apparatus shown in FIG. 9. The storage unit 1303 is configured to store program code and data that are of the second communication apparatus.

When the schematic diagram of structure shown in FIG. 13 is used to show the structure of the second communication apparatus in the foregoing embodiments, the communication apparatus 130 may be a device (for example, a network device), or may be a chip in the device.

When the communication apparatus 130 is a device, the processing unit 1301 may be a processor or a controller, and the communication unit 1302 may be a communication interface, a transceiver, a transceiver machine, a transceiver circuit, a transceiver apparatus, or the like. The communication interface is a collective term, and may include one or more interfaces. The storage unit 1303 may be a memory. When the communication apparatus 130 is a chip in the device, the processing unit 1301 may be a processor or a controller, and the communication unit 1302 may be an input interface and/or an output interface, a pin, a circuit, or the like. The storage unit 1303 may be a storage unit (for example, a register or a cache) in the chip, or may be a storage unit (for example, a read-only memory (read-only memory, ROM) or a random access memory (random access memory, RAM)) that is in the device and that is located outside the chip.

The communication unit may also be referred to as a transceiver unit. An antenna and a control circuit that have receiving and sending functions in the communication apparatus 130 may be considered as the communication unit 1302 in the communication apparatus 130, and a processor that has a processing function may be considered as the processing unit 1301 in the communication apparatus 130. Optionally, a component configured to implement a receiving function in the communication unit 1302 may be considered as a receiving unit. The receiving unit is configured to perform a receiving step in embodiments of this application. The receiving unit may be a receiver machine, a receiver, a receiver circuit, or the like. A component configured to implement a sending function in the communication unit 1302 may be considered as a sending unit. The sending unit is configured to perform a sending step in embodiments of this application. The sending unit may be a transmitter machine, a transmitter, a transmitter circuit, or the like.

When the integrated unit in FIG. 13 is implemented in a form of a software functional module and sold or used as an independent product, the integrated unit may be stored in a computer-readable storage medium. Based on such an understanding, the technical solutions in embodiments of this application essentially, the part contributing to the conventional technology, or all or a part of the technical solutions may be implemented in a form of a software product. The computer software product is stored in a storage medium and includes several instructions for instructing a computer device (which may be a personal computer, a server, a network device, or the like) or a processor (processor) to perform all or a part of the steps of the methods described in embodiments of this application. The storage medium storing the computer software product includes any medium that can store program code, such as a USB flash drive, a removable hard disk, a read-only memory, a random access memory, a magnetic disk, or an optical disc.

The unit in FIG. 13 may also be referred to as a module. For example, the processing unit may be referred to as a processing module.

Figure 14:
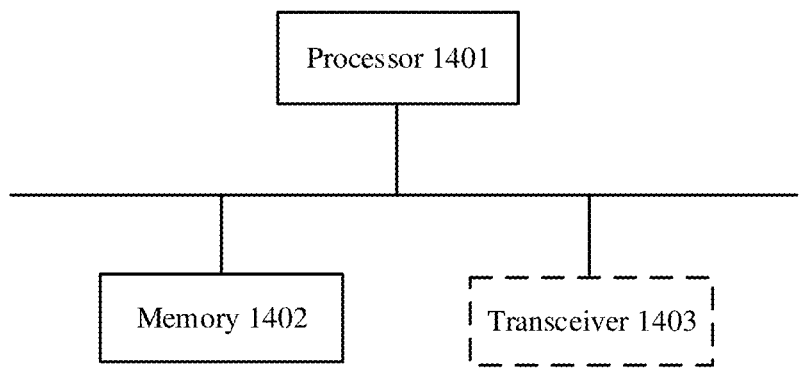
FIG. 14 is a schematic diagram depicting hardware structure of a communication apparatus according to an embodiment of this application.
Figure 15:
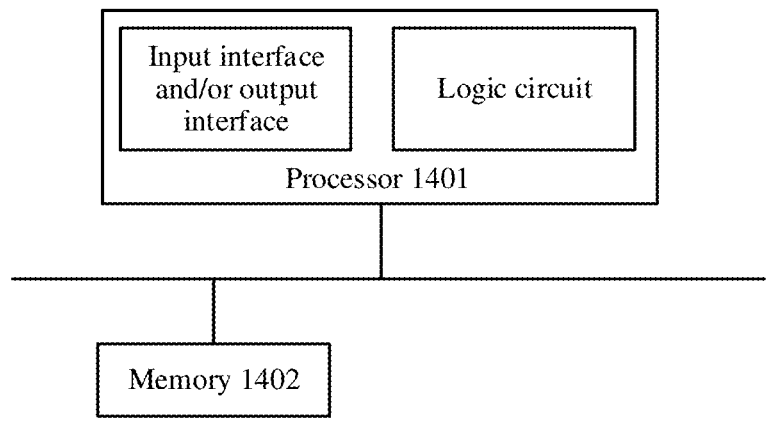
FIG. 15 is a schematic diagram depicting another hardware structure of a communication apparatus according to an embodiment of this application.

An embodiment of this application further provides a schematic diagram of a hardware structure of a communication apparatus. Refer to FIG. 14 or FIG. 15. The communication apparatus includes a processor 1401, and optionally, further includes a memory 1402 connected to the processor 1401.

The processor 1401 may be a general-purpose central processing unit (CPU), a microprocessor, an application-specific integrated circuit (ASIC), or one or more integrated circuits configured to control program execution of the solutions of this application. The processor 1401 may alternatively include a plurality of CPUs, and the processor 1401 may be a single-core (single-CPU) processor or a multi-core (multi-CPU) processor. The processor herein may refer to one or more devices, circuits, or processing cores configured to process data (for example, computer program instructions).

The memory 1402 may be a ROM or another type of static storage device that can store static information and instructions, a RAM or another type of dynamic storage device that can store information and instructions, an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that can be accessed by a computer. However, the memory 1402 is not limited in this embodiment of this application. The memory 1402 may exist independently, or may be integrated into the processor 1401. The memory 1402 may include computer program code. The processor 1401 is configured to execute the computer program code stored in the memory 1402, to implement the method provided in embodiments of this application.

In a first possible implementation, as shown in FIG. 14, the communication apparatus further includes a transceiver 1403. The processor 1401, the memory 1402, and the transceiver 1403 are connected through a bus. The transceiver 1403 is configured to communicate with another device or a communication network. Optionally, the transceiver 1403 may include a transmitter and a receiver. A component configured to implement a receiving function in the transceiver 1403 may be considered as a receiver. The receiver is configured to perform a receiving step in embodiments of this application. A component configured to implement a sending function in the transceiver 1403 may be considered as a transmitter. The transmitter is configured to perform a sending step in embodiments of this application.

Based on the first possible implementation, the schematic diagram of structure shown in FIG. 14 may be used to show structures of the first communication apparatus and the second communication apparatus in the foregoing embodiments.

When the schematic diagram of structure shown in FIG. 14 is used to show the structure of the first communication apparatus in the foregoing embodiments, the processor 1401 is configured to control and manage actions of the first communication apparatus. For example, the processor 1401 is configured to support the first communication apparatus in performing 901 and 902 in FIG. 9, 1201 to 1203 in FIG. 12 (in this case, the first communication apparatus is a terminal), and/or an action performed by the first communication apparatus in another process described in embodiments of this application. The processor 1401 may communicate with another network entity through the transceiver 1403, for example, communicate with the second communication apparatus shown in FIG. 9. The memory 1402 is configured to store program code and data that are of the first communication apparatus.

When the schematic diagram of structure shown in FIG. 14 is used to show the structure of the second communication apparatus in the foregoing embodiments, the processor 1401 is configured to control and manage actions of the second communication apparatus. For example, the processor 1401 is configured to support the second communication apparatus in performing 902 to 904 in FIG. 9, 1204 to 1207 in FIG. 12 (in this case, the second communication apparatus is a network device), and/or an action performed by the second communication apparatus in another process described in embodiments of this application. The processor 1401 may communicate with another network entity through the transceiver 1403, for example, communicate with the first communication apparatus shown in FIG. 9. The memory 1402 is configured to store program code and data that are of the second communication apparatus.

In a second possible implementation, the processor 1401 includes a logic circuit and at least one of an input interface and an output interface. The output interface is configured to perform a sending action in a corresponding method, and the input interface is configured to perform a receiving action in the corresponding method.

Based on the second possible implementation, as shown in FIG. 15, the schematic diagram of structure shown in FIG. 15 may be used to show structures of the first communication apparatus and the second communication apparatus in the foregoing embodiments.

When the schematic diagram of structure shown in FIG. 15 is used to show the structure of the first communication apparatus in the foregoing embodiments, the processor 1401 is configured to control and manage actions of the first communication apparatus. For example, the processor 1401 is configured to support the first communication apparatus in performing 901 and 902 in FIG. 9, 1201 to 1203 in FIG. 12 (in this case, the first communication apparatus is a terminal), and/or an action performed by the first communication apparatus in another process described in embodiments of this application. The processor 1401 may communicate with another network entity by using at least one of the input interface or the output interface, for example, communicate with the second communication apparatus shown in FIG. 9. The memory 1402 is configured to store program code and data that are of the first communication apparatus.

When the schematic diagram of structure shown in FIG. 15 is used to show the structure of the second communication apparatus in the foregoing embodiments, the processor 1401 is configured to control and manage actions of the second communication apparatus. For example, the processor 1401 is configured to support the second communication apparatus in performing 902 to 904 in FIG. 9, 1204 to 1207 in FIG. 12 (in this case, the second communication apparatus is a network device), and/or an action performed by the second communication apparatus in another process described in embodiments of this application. The processor 1401 may communicate with another network entity by using at least one of the input interface or the output interface, for example, communicate with the first communication apparatus shown in FIG. 9. The memory 1402 is configured to store program code and data that are of the second communication apparatus.

In an implementation process, steps of the methods in embodiments may be completed by using a hardware integrated logical circuit in the processor, or by using instructions in a form of software. The steps of the methods disclosed with reference to embodiments of this application may be directly performed by a hardware processor, or may be performed by using a combination of hardware in the processor and a software module.

An embodiment of this application further provides a computer-readable storage medium, including instructions. When the instructions are run on a computer, the computer is enabled to perform any one of the foregoing methods.

An embodiment of this application further provides a computer program product including instructions. When the computer program product runs on a computer, the computer is enabled to perform any one of the foregoing methods.

An embodiment of this application further provides a communication apparatus, including a processor and an interface circuit. The interface circuit is configured to receive a signal from another communication apparatus other than the communication apparatus and transmit the signal to the processor, or send a signal from the processor to another communication apparatus other than the communication apparatus. The processor is configured to implement any one of the foregoing methods by using a logic circuit or by executing code instructions.

An embodiment of this application further provides a communication system, including a first communication apparatus and a second communication apparatus.

All or a part of the foregoing embodiments may be implemented by using software, hardware, firmware, or any combination thereof. When a software program is used to implement embodiments, embodiments may be implemented completely or partially in a form of a computer program product. The computer program product includes one or more computer instructions. When the computer program instructions are loaded and executed on a computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium that can be accessed by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to embodiments, in a process of implementing this application that claims protection, persons skilled in the art may understand and implement another variation of the disclosed embodiments by viewing the accompanying drawings, disclosed content, and the accompanying claims. In the claims, "comprising" (comprising) does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

Although this application is described with reference to specific features and embodiments thereof, it is clear that various modifications and combinations may be made to them without departing from the spirit and scope of this application. Correspondingly, the specification and accompanying drawings are merely example description of this application defined by the accompanying claims, and are considered to have covered any of or all modifications, variations, combinations or equivalents within the scope of this application. It is clear that a person skilled in the art can make various modifications and variations to this application without departing from the spirit and scope of this application. This application is intended to cover the modifications and variations of this application provided that they fall within the scope of the following claims and equivalent technologies of this application.

What is claimed is:

1. A communication method, comprising:
   determining, by a first communication apparatus, a first index, wherein the first index indicates a first precoding vector of a codebook, and the first precoding vector includes spatial angle information corresponding to a propagation angle of an electromagnetic wave and spatial depth information corresponding to a propagation depth of the electromagnetic wave of a channel between the first communication apparatus and a second communication apparatus; and
   sending, by the first communication apparatus, the first index to the second communication apparatus.

2. The method according to claim 1, wherein the determining the first index including the first precoding vector includes determining the codebook to which the first precoding vector belongs, wherein the codebook includes K×M precoding vectors, each precoding vector is an N-dimensional vector, K is a quantization level quantity of a spatial depth of the channel corresponding to the codebook, M is a quantization level quantity of a spatial angle of the channel corresponding to the codebook, N is an antenna port quantity of the second communication apparatus, and K, M, and N are all integers greater than 0.

3. The method according to claim 2, wherein the codebook to which the first precoding vector belongs is obtained by sampling an antenna port group steering vector of the second communication apparatus by using a quantization level set of the spatial depth of the channel and a quantization level set of the spatial angle of the channel.

4. The method according to claim 3, wherein the antenna port group steering vector is determined based on the spatial depth of the channel, the spatial angle of the channel, and an antenna port group-related parameter of the second communication apparatus, and the antenna port group-related parameter includes one or more of antenna port spacing, an antenna port quantity, and a spatial arrangement of antenna ports.

5. The method according to claim 3, wherein the quantization level set of the spatial depth of the channel is determined based on prior statistical information of the channel and an allowed quantity of bits for quantization, and the prior statistical information includes: a maximum value of the spatial depth of the channel and a minimum value of the spatial depth of the channel, or an average value of spatial depths of the channel and a variance of spatial depths of the channel, or a probability distribution function of the spatial depth of the channel.

6. The method according to claim 2, wherein the determining, by the first communication apparatus, the first index includes:
matching, by the first communication apparatus, the codebook with an obtained channel state information (CSI) estimation value, to determine an index corresponding to a precoding vector that meets a matching degree requirement as the first index; or
matching, by the first communication apparatus, the codebook with an obtained CSI estimation value and a noise statistics covariance matrix, to determine an index corresponding to a precoding vector that meets a matching degree requirement as the first index.

7. The method according to claim 2, wherein the first index includes L sub-indexes, L represents a quantity of spatial multiplexing layers of the first communication apparatus, L is an integer greater than 1, and the determining, by the first communication apparatus, the first index includes:
matching, by the first communication apparatus, the codebook with an obtained CSI estimation value, to determine indexes corresponding to L precoding vectors that meet a matching degree requirement as the first index; or
matching, by the first communication apparatus, the codebook with an obtained CSI estimation value and a noise statistics covariance matrix, to determine indexes corresponding to L precoding vectors that meet a matching degree requirement as the first index.

8. A communication method, comprising:
receiving, by a second communication apparatus, a first index from a first communication apparatus, wherein the first index indicates a first precoding vector of a codebook, and the first precoding vector includes spatial angle information corresponding to a propagation angle of an electromagnetic wave and spatial depth information corresponding to a propagation depth of the electromagnetic wave of a channel between the first communication apparatus and the second communication apparatus;
determining, by the second communication apparatus, the first precoding vector based on the first index; and
precoding, by the second communication apparatus, data based on the first precoding vector.

9. The method according to claim 8, wherein the method further comprises:
separately receiving, by the second communication apparatus, indexes from S-1 first communication apparatuses other than the first communication apparatus, wherein S is an integer greater than 1; and
in response to precoding vectors corresponding to S1 indexes of S indexes having a same spatial angle component but different spatial depth components, performing, by the second communication apparatus, multiplex transmission with S1 first communication apparatuses based on the spatial depth components of the precoding vectors corresponding to the S1 indexes, wherein the S1 indexes are a part or all of the S indexes, the S indexes are indexes received by the second communication apparatus from the first communication apparatus and the S-1 first communication apparatuses, the S1 first communication apparatuses are first communication apparatuses that report the S1 indexes, and S1 is an integer greater than 1 and less than or equal to S; or
in response to precoding vectors corresponding to S2 indexes of S indexes having different spatial angle components and different spatial depth components, performing, by the second communication apparatus, multiplex transmission with S2 first communication apparatuses based on the spatial depth components and/or the spatial angle components of the precoding vectors corresponding to the S2 indexes, wherein the S2 indexes are a part or all of the S indexes, the S indexes are indexes received by the second communication apparatus from the first communication apparatus and the S-1 first communication apparatuses, the S2 first communication apparatuses are first communication apparatuses that report the S2 indexes, and S2 is an integer greater than 1 and less than or equal to S.

10. The method according to claim 8, wherein the receiving the first index indicating the first precoding vector includes determining the first precoding vector from the codebook, wherein the codebook includes K×M precoding vectors, each precoding vector is an N-dimensional vector, K is a quantization level quantity of a spatial depth of the channel corresponding to the codebook, M is a quantization level quantity of a spatial angle of the channel corresponding to the codebook, N is an antenna port quantity of the second communication apparatus, and K, M, and N are all integers greater than 0.

11. The method according to claim 10, wherein the codebook to which the first precoding vector belongs is obtained by sampling an antenna port group steering vector of the second communication apparatus by using a quantization level set of the spatial depth of the channel and a quantization level set of the spatial angle of the channel.

12. The method according to claim 11, wherein the antenna port group steering vector is determined based on the spatial depth of the channel, the spatial angle of the channel, and an antenna port group-related parameter of the second communication apparatus, and the antenna port group-related parameter includes one or more of antenna port spacing, an antenna port quantity, and a spatial arrangement of antenna ports.

13. The method according to claim 11, wherein the quantization level set of the spatial depth of the channel is determined based on prior statistical information of the channel and an allowed quantity of bits for quantization, and the prior statistical information includes: a maximum value of the spatial depth of the channel and a minimum value of the spatial depth of the channel, or an average value of spatial depths of the channel and a variance of spatial depths of the channel, or a probability distribution function of the spatial depth of the channel.

14. A communication apparatus, comprising:
an interface circuit;
a memory storing computer-readable instructions; and
a processor connected to the memory, wherein the processor is configured to execute the computer-readable instructions to:
determine a first index, wherein the first index indicates a first precoding vector of a codebook, and the first precoding vector includes spatial angle information corresponding to a propagation angle of an electromagnetic wave and spatial depth information corresponding to a propagation depth of the electromagnetic wave of a channel between the first communication apparatus and a second communication apparatus; and send first index, via the interface circuit, to the second communication apparatus.

15. The apparatus according to claim 14, wherein the processor is configured to determine the first precoding vector from the codebook, wherein the codebook includes K×M precoding vectors, each precoding vector is an N-dimensional vector, K is a quantization level quantity of a spatial depth of the channel corresponding to the codebook, M is a quantization level quantity of a spatial angle of the channel corresponding to the codebook, N is an antenna port quantity of the second communication apparatus, and K, M, and N are all integers greater than 0.

16. The apparatus according to claim 15, wherein the processor is configured to obtain the codebook to which the first precoding vector belongs by sampling an antenna port group steering vector of the second communication apparatus by using a quantization level set of the spatial depth of the channel and a quantization level set of the spatial angle of the channel.

17. The apparatus according to claim 16, wherein the processor is configured to determine the antenna port group steering vector based on the spatial depth of the channel, the spatial angle of the channel, and an antenna port group-related parameter of the second communication apparatus, and the antenna port group-related parameter includes one or more of antenna port spacing, an antenna port quantity, and a spatial arrangement of antenna ports.

18. The apparatus according to claim 16, wherein the processor is configured to determine the quantization level set of the spatial depth of the channel based on prior statistical information of the channel and an allowed quantity of bits for quantization, and the prior statistical information includes: a maximum value of the spatial depth of the channel and a minimum value of the spatial depth of the channel, or an average value of spatial depths of the channel and a variance of spatial depths of the channel, or a probability distribution function of the spatial depth of the channel.

19. The apparatus according to claim 15, wherein the processor is configured to match the codebook with an obtained channel state information (CSI) estimation value, to determine an index corresponding to a precoding vector that meets a matching degree requirement as the first index.

20. The apparatus according to claim 15, wherein the first index includes L sub-indexes, L represents a quantity of spatial multiplexing layers of the first communication apparatus, L is an integer greater than 1, and the processor is configured to:

match the codebook with an obtained CSI estimation value, to determine indexes corresponding to L precoding vectors that meet a matching degree requirement as the first index; or match the codebook with an obtained CSI estimation value and a noise statistics covariance matrix, to determine indexes corresponding to L precoding vectors that meet a matching degree requirement as the first index.

* * * * *

UNITED STATES PATENT AND TRADEMARK OFFICE
CERTIFICATE OF CORRECTION

PATENT NO. : 12,155,430 B2
APPLICATION NO. : 18/073608
DATED : November 26, 2024
INVENTOR(S) : Jianbiao Xu It is certified that error appears in the above-identified patent and that said Letters Patent is hereby corrected as shown below:

On the Title Page (1) Column 2, The Abstract should be replaced with the following:
A communication method and apparatus. A first communication apparatus determines a first index indicating a first precoding vector, and sends the first index to a second communication apparatus. The second communication apparatus receives the first index from the first communication apparatus, determines the first precoding vector based on the first index, and precodes data based on the first precoding vector. The first precoding vector includes spatial angle information and spatial depth information of a channel between the first communication apparatus and the second communication apparatus.

In the Specification (2) Column 22, Line 63-66 should be replaced with the following:
The CSI estimation value may be denoted as $\tilde{\tilde{H}}$, and $\tilde{\tilde{H}}$ is a $N_R \times N$ matrix, where $N_R$ is a quantity of receive antennas of the terminal, and $N_R$ is an integer greater than 0. When $N_R$ is equal to 1, $\tilde{\tilde{H}}$ may be denoted as $\hat{h}$.

Signed and Sealed this
Twenty-first Day of January, 2025

Coke Morgan Stewart
*Acting Director of the United States Patent and Trademark Office*